United States Patent
Yang

(10) Patent No.: US 8,730,602 B2
(45) Date of Patent: May 20, 2014

(54) METHOD AND APPARATUS FOR DETECTING TOUCH-DOWN AND CONTACT BETWEEN A HEAD AND A STORAGE MEDIUM USING A SENSOR, AND A DISK DRIVE AND STORAGE MEDIUM USING THE METHOD

(75) Inventor: Won-choul Yang, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 462 days.

(21) Appl. No.: 13/069,709

(22) Filed: Mar. 23, 2011

(65) Prior Publication Data

US 2011/0235207 A1    Sep. 29, 2011

(30) Foreign Application Priority Data

Mar. 26, 2010 (KR) .................. 10-2010-0027542

(51) Int. Cl.
*G11B 23/02* (2006.01)
*G11B 27/36* (2006.01)

(52) U.S. Cl.
USPC .............................. 360/31; 360/75

(58) Field of Classification Search
None
See application file for complete search history.

(56) References Cited

U.S. PATENT DOCUMENTS

| | | | |
|---|---|---|---|
| 6,226,136 B1 | 5/2001 | Chern | |
| 6,265,869 B1 | 7/2001 | Takahashi | |
| 7,016,139 B2 * | 3/2006 | Baumgart et al. | 360/75 |
| 7,180,692 B1 | 2/2007 | Che et al. | |
| 7,274,523 B2 | 9/2007 | Ozanoglu et al. | |
| 7,400,473 B1 * | 7/2008 | Krajnovich et al. | 360/294.7 |
| 7,522,360 B2 * | 4/2009 | Imamura et al. | 360/31 |
| 7,649,706 B2 * | 1/2010 | Yang | 360/75 |
| 7,796,356 B1 * | 9/2010 | Fowler et al. | 360/75 |
| 8,059,357 B1 * | 11/2011 | Knigge et al. | 360/75 |
| 8,320,069 B1 * | 11/2012 | Knigge et al. | 360/75 |
| 2002/0067574 A1 | 6/2002 | Gillis et al. | |
| 2010/0073795 A1 | 3/2010 | Amano | |

FOREIGN PATENT DOCUMENTS

JP    2000-011305    1/2000

OTHER PUBLICATIONS

A. Khurshudov et al., "Head-disk contact detection in the hard-disk drives," Elsevier Science B.V., 2003, pp. 1314-1322.

* cited by examiner

Primary Examiner — K. Wong
(74) Attorney, Agent, or Firm — Hollingsworth Davis, LLC

(57) ABSTRACT

A method and apparatus for detecting a touch-down and contact between a head and a storage medium by using a signal generated by a data storage device, specifically by a sensor installed in a slider. The method includes: separating a signal detected by a sensor into a direct current (DC) component and an alternating current (AC) component, wherein the sensor has an electrical characteristic that changes according to temperature; using the DC component to detect a touch-down state of the head during a touch-down test to determine a value of a control signal for adjusting the flying height of the head; and using the AC component to detect a contacting state between the head and the storage medium in an operating state of the apparatus.

19 Claims, 19 Drawing Sheets

METHOD AND APPARATUS FOR DETECTING TOUCH-DOWN AND CONTACT BETWEEN A HEAD AND A STORAGE MEDIUM USING A SENSOR, AND A DISK DRIVE AND STORAGE MEDIUM USING THE METHOD

CROSS-REFERENCE TO RELATED APPLICATIONS

This application claims the benefit of Korean Patent Application No. 10-2010-0027542, filed on Mar. 26, 2010, in the Korean Intellectual Property Office, the disclosure of which is incorporated herein in its entirety by reference.

BACKGROUND

The inventive concept relates to a method and apparatus for detecting a touch-down in a data storage device and contact between a head and a storage medium (e.g., a disk), and more particularly, to a method and apparatus for detecting a touch-down and contact between the head and the storage medium by using a signal generated by a sensor installed in a slider in which the head is installed.

A disk drive, as a data storage device, is connected to a host device, and records data in a storage medium or reads data recorded in the storage medium according to a command of the host device. As technology improves, disk drives gradually have a higher capacity, a higher density, and a more compact size, and accordingly the bits per inch (BPI) (i.e., the density in a disk rotation direction) and the tracks per inch (TPI) (i.e., the density in the radius direction) are increasing. Thus a more accurate mechanism is required.

Accordingly, there is a demand for research into a technology for detecting a touch-down state of a head, and a technology for detecting a contacting state between the head and the storage medium in an operating state so as to adjust a flying height, i.e., an interval or gap between the head and the storage medium, which affects the performance of the disk drive.

SUMMARY

The inventive concept provides a method of detecting a touch-down and contact between a head and a storage medium by using a sensor installed in a slider, wherein a touch-down state of the head and a contacting state between the head and the storage medium are detected by processing a signal detected by the sensor.

The inventive concept also provides an apparatus for detecting a touch-down and contact between a head and storage medium by using a sensor installed in a slider, wherein a touch-down state of the head and a contacting state between the head and the storage medium are detected by processing a signal detected by the sensor.

The inventive concept also provides a disk drive that employs a method of detecting a touch-down and contact between a head and a storage medium by using a sensor installed in a slider, wherein a touch-down state of the head and a contacting state between the head and the storage medium are detected by processing a signal detected by the sensor.

The inventive concept also provides a storage medium having recorded thereon program codes for executing a method of detecting a touch-down and contact between a head and a storage medium by using a sensor.

According to an aspect of the inventive concept, there is provided a method of detecting a touch-down and contact between a head and a storage medium in a data storage device. The method comprises: separating a signal detected by a sensor into a direct current (DC) component and an alternating current (AC) component, wherein the sensor has an electrical characteristic which changes according to a temperature; using the DC component to detect a touch-down state of the head during a touchdown test to determine a value of a control signal for adjusting a flying height of the head, the value corresponding to a target flying height of the head; and using the AC component to detect a contacting state between the head and the storage medium in an operating state of the data storage device The electric characteristic may be a resistance.

The sensor may include a device including nickel iron (NiFe), and may be installed in a slider.

The signal detected by the sensor may be separated into the DC component and the AC component by filters.

The signal detected by the sensor may include a voltage signal or a current signal detected by the sensor that corresponds to a resistance value of the sensor while a current or a voltage, respectively, generated by a constant current source or a constant voltage source is applied to the sensor.

In detecting of the touch-down state of the head, an offset compensation may be performed on the DC component so that the DC component is adjusted to be within an input range of an analog to digital converter, and the method may further include generating information for determining the touch-down state when an amplitude or a change rate of the DC component having the compensated offset satisfies a threshold condition.

In detecting of the contacting state between the head and the storage medium in an operating state of the data storage device, information for indicating that there may be contact between the head and the storage medium may be generated when an amplitude of the AC component is greater than or equal to a threshold value.

The method may further include controlling the flying height of the head based on information generated by detecting the touch-down state of the head or the contacting state between the head and the storage medium.

The control signal for adjusting the flying height of the head may include a signal for adjusting power supplied to a heater installed in a slider in which the head is provided.

According to another aspect of the inventive concept, there is provided an apparatus for detecting a touch-down and contact between a head and a storage medium in a storage device. The apparatus comprises: a sensor installed in a slider and having a resistance value that changes according to a temperature; a constant current source for supplying a constant current to the sensor; a direct current (DC) component extractor for separating and outputting a DC component from a voltage signal across two terminals of the sensor; an alternating current (AC) component extractor for separating and outputting an AC component from the voltage signal across the two terminals of the sensor; a subtractor for outputting an offset compensated DC component by subtracting an initially set offset voltage from the DC component output from the DC component extractor; and a determiner for determining a touch-down state of the head during a touchdown test to determine a value of a control signal for adjusting a flying height of the head corresponding to a target flying height of the head by using the offset compensated DC component, and for determining a contacting state between the head and the storage medium in an operating state of the data storage device by using the AC component output from the AC component extractor.

According to another aspect of the inventive concept, there is provided an apparatus for detecting a touch-down and contact between a head and a storage medium in a storage device. The apparatus comprises: a constant voltage source for generating a constant voltage, the constant voltage source having first and second terminals; a sensor installed in a slider and having a resistance value that changes according to a temperature, the sensor having first and second terminals where the second terminal is connected to the second terminal of the constant voltage source; a resistor having a fixed resistance value and being connected between the first terminal of the constant voltage source and the first terminal of the sensor; a direct current (DC) component extractor for separating and outputting a DC component from a voltage signal across the first and second terminals of the sensor; an alternating current (AC) component extractor for separating and outputting an AC component from the voltage signal across the first and second terminals of the sensor; a subtractor for outputting an offset compensated DC component by subtracting an initially set offset voltage from the DC component output from the DC component extractor; and a determiner for determining a touch-down state of the head in a touch-down test to determine a value of a control signal for adjusting a flying height of the head corresponding to a target flying height of the head by using the offset compensated DC component, and for determining a contacting state between the head and the storage medium in an operating state of the storage device by using the AC component output from the AC component extractor.

The apparatus may further include at least one amplifier for amplifying the voltage signal.

The DC component extractor may include a low pass filter.

The AC component extractor may include a high pass filter or a band pass filter.

The apparatus may further include an overvoltage prevention circuit between the two terminals of the sensor.

According to another aspect of the inventive concept, there is provided a disk drive, comprising: a disk for storing information; a slider in which are installed a heater, a sensor having a resistance value that changes according to a temperature, and a head for recording information on the disk or reading information from the disk; a sensor signal processor for: separating a voltage signal across two terminals of the sensor or a current signal flowing in the sensor into a direct current (DC) component and an alternating current (AC) component that correspond to a resistance value of the sensor while a current or a voltage, respectively, generated by a constant current source or a constant voltage source is applied to the sensor; detecting a touch-down state of a head in a touch-down test to determine a value of a first signal corresponding to a target flying height of the head by using the separated DC current component, and detecting a contacting state between the head and the disk in an operating state by using the separated AC component; and a controller for generating the first signal for adjusting power supplied to the heater, and for adjusting the value of the first signal based on the result of determining the touch-down state of the head in the touch-down test, and the contacting state between the head and the disk in the operating state.

The sensor signal processor may include: a constant current source for supplying a constant current to the sensor; a DC component extractor for separating and outputting a DC component from a voltage signal across two terminals of the sensor; an AC component extractor for separating and outputting an AC component from the voltage signal across the two terminals of the sensor; a subtractor for outputting an offset compensated DC component by subtracting an initially set offset voltage from the DC component output from the DC component extractor; and a determiner for determining the touch-down state of the head in a touch-down test to determine the value of the first signal corresponding to the target flying height of the head by using the offset compensated DC component, and for determining the contacting state between the head and the disk in an operating state of the disk drive by using the AC component output from the AC component extractor.

The sensor signal processor may include: a constant voltage source for generating a constant voltage; a resistor having a fixed resistance value; a sensor installed in a slider and having a resistance value that changes according to temperature change; a DC component extractor for separating and outputting a DC component from a voltage signal across two terminals of the sensor, in a circuit in which the constant voltage source, the resistor, and the sensor are connected in series; an AC component extractor for separating and outputting an AC component from the voltage signal across the two terminals of the sensor; a subtractor for outputting an offset compensated DC component by subtracting an initially set offset voltage from the DC component output from the DC component extractor; and a determiner for determining the touch-down state of the head used to determine the value of the first signal corresponding to the target flying height of the head by using the offset compensated DC component, and determining the contacting state between the head and the disk in an operating state of the disk drive by using the AC component output from the AC component extractor.

According to another aspect of the inventive concept, there is provided a tangible storage medium having recorded thereon program codes for execution by a processor or computer to execute a method of detecting a touch-down and contact between a head and a storage medium (e.g., a disk) using a sensor.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
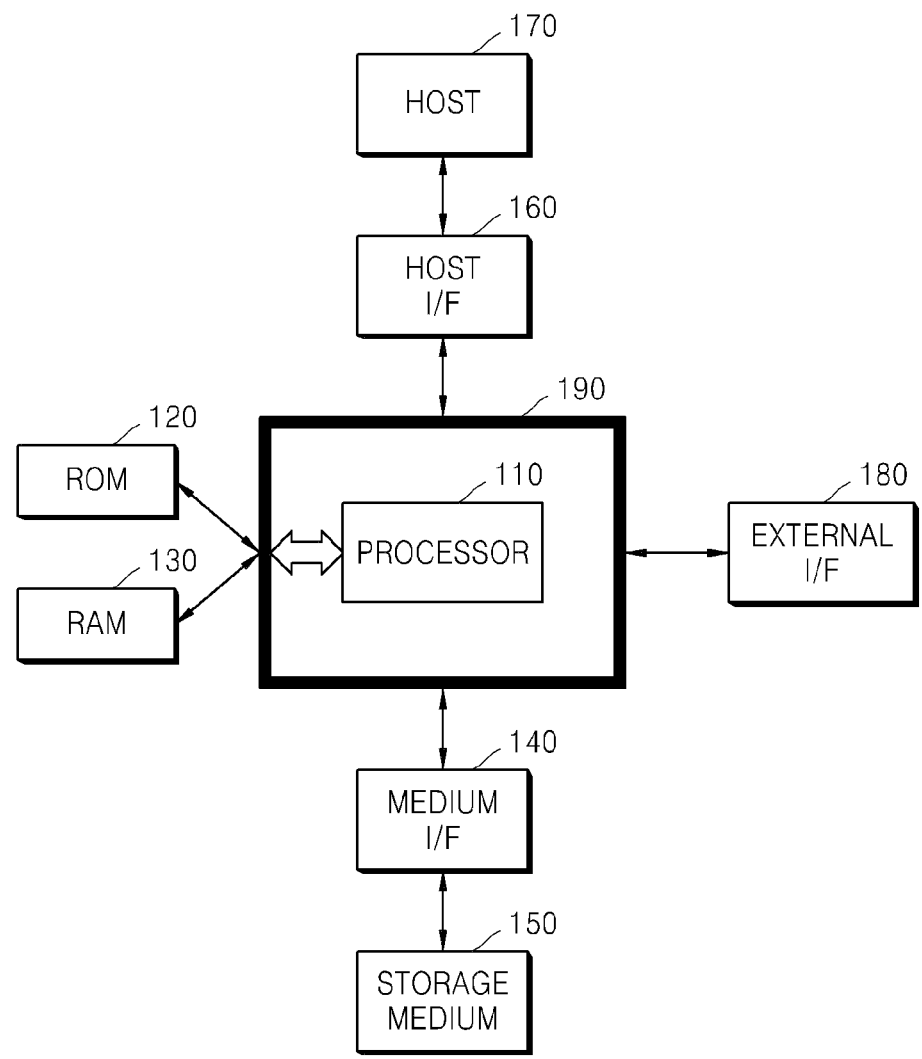
FIG. 1 is a block diagram of one example embodiment of a data storage device.

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the concept of the inventive concept to those of ordinary skill in the art. Like reference numerals in the drawings denote like elements, and thus repetitions of their descriptions will be omitted.

The inventive concept will now be described more fully with reference to the accompanying drawings, in which exemplary embodiments of the inventive concept are shown.

FIG. 1 is a block diagram of one embodiment of a data storage device.

Referring to FIG. 1, data storage device includes a processor 110, a read only memory (ROM) 120, a random access memory (RAM) 130, a medium interface (I/F) 140, a storage medium 150, a host I/F 160, a host device 170, an external I/F 180, and a bus 190.

Processor 110 interprets a command, and controls elements of the data storage device according to a result of the interpretation. Processor 110 includes a code object management unit (not shown), and loads a code object stored in storage medium 150 into RAM 130 by using the code object management unit. Processor 110 loads code objects for executing a method of detecting a touch-down and contact between a head and a storage medium 150 by using a sensor, as illustrated in FIGS. 12 through 15, into RAM 130.

Processor 110 detects a touch-down state of a head and a contacting state between the head and storage medium 150 and executes a task of adjusting a flying height of the head according to the method of FIGS. 12 through 15 by using the code objects loaded into RAM 130, and stores information required to detect the touch-down state and the contacting state and to adjust the flying height in storage medium 150 or ROM 120. Examples of such information include a first threshold value TH1 used to determine the contacting state, second and third threshold values TH2 and TH3 used to determine the touch-down state, and a step increment of a flying on demand digital-to-analog converted signal (FOD DAC) ($\Delta V$).

The method of detecting the touch-down state and the contacting state, and the method of adjusting the flying height by processor 110 will be described in detail later with reference to FIGS. 12 through 15.

In ROM 120, program codes and data required for operating the data storage device are stored.

The program codes and data stored in ROM 120, or those stored in storage medium 150, are loaded into RAM 130 according to control by processor 110.

Storage medium 150 may include a disk as a main storage medium of the data storage device. The data storage device may include a disk drive.

Figure 3:
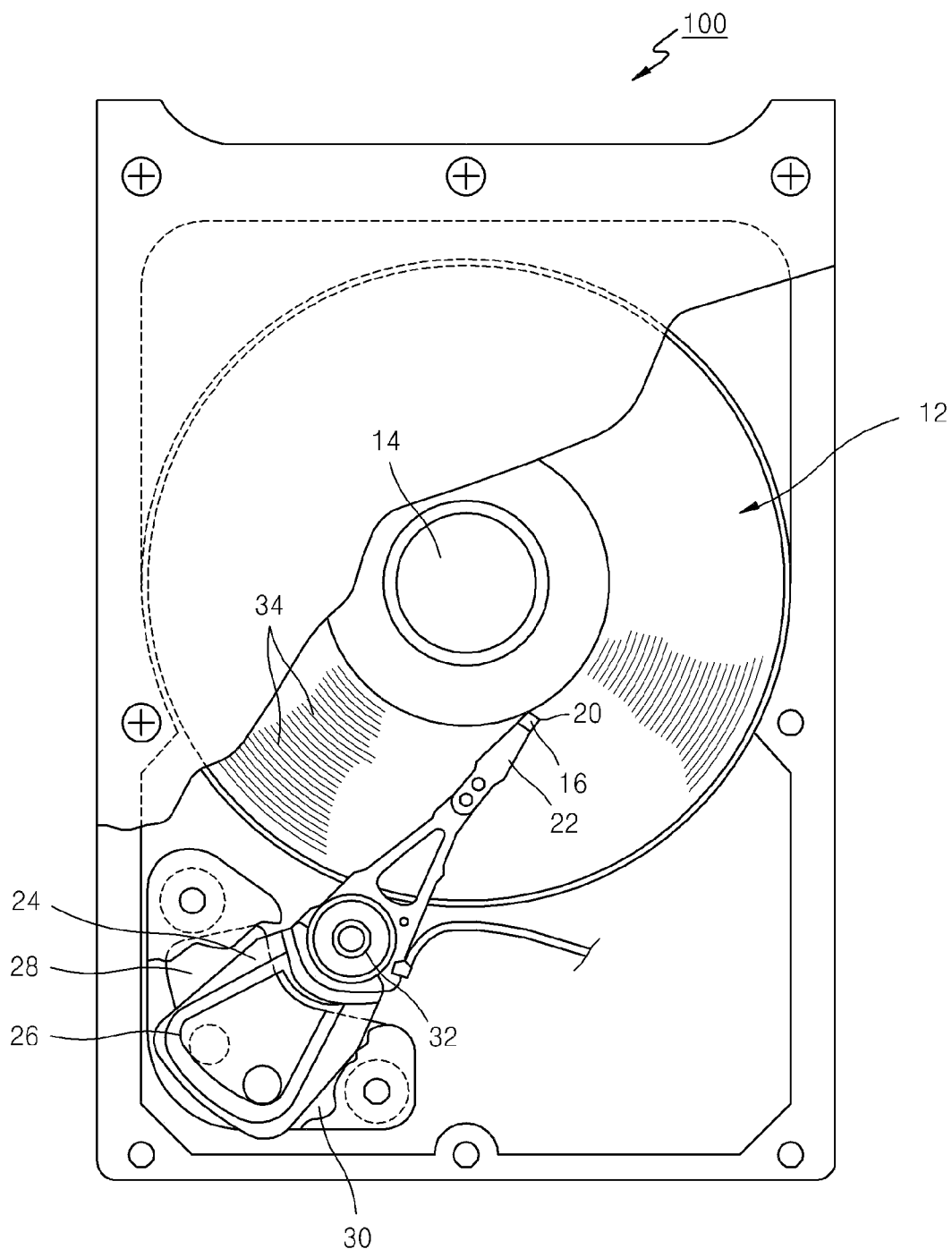
FIG. 3 is a plan view of one example embodiment of a head disk assembly of a disk drive.

FIG. 3 is a plan view of an example embodiment of a head disk assembly 100 of a disk drive. Referring to FIG. 3, head disk assembly 100 includes at least one disk 12 that is rotated by a spindle motor 14. The disk drive also includes a head 16 that is located adjacent to a surface of disk 12.

While disk 12 is being rotated, head 16 senses a magnetic field of disk 12 or magnetizes disk 12 to read or write information from/to disk 12. In general, head 16 is associated with the surface of disk 12. Although one head 16 is illustrated in FIG. 3, it should be understood that head 16 includes a writing head (so-called writer) for magnetizing disk 12 and a reading head (so-called reader) for sensing the magnetic field of disk 12. The reading head may include a magneto-resistive (MR) device. Head 16 is usually referred to as a magnetic head or a transducer.

Head 16 may be mounted on a slider 20. The slider 20 generates an air bearing between a surface of head 16 and the surface of disk 12. Slider 20 is integrated with a head gimbal assembly 22. Head gimbal assembly 22 is attached to an actuator arm 24 having a voice coil 26. Voice coil 26 is disposed adjacent to a magnetic assembly 28 to define a voice coil motor (VCM) 30. A current supplied to voice coil 26 generates torque for rotating actuator arm 24 with respect to a bearing assembly 32. Due to the rotation of actuator arm 24, head 16 is moved across the surface of disk 12.

Figure 5:
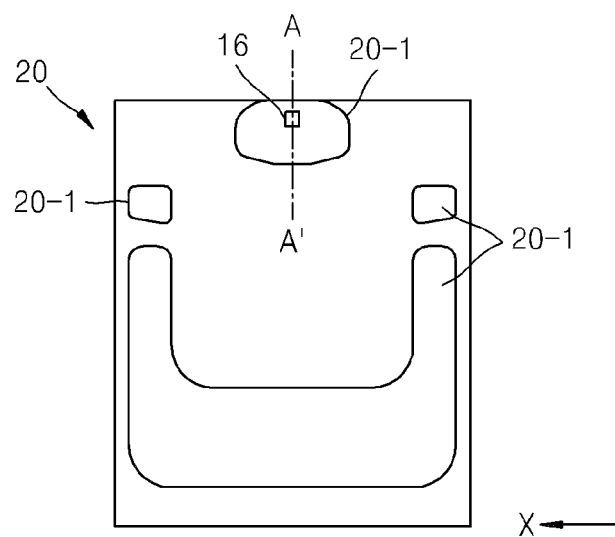
FIG. 5 is a plan view of one example embodiment of a slider of a disk drive.

FIG. 5 is a plan view of an example embodiment of slider 20 of the disk drive.

As illustrated in FIG. 5, patterns 20-1 are formed on a surface of slider 20 so as to generate an air bearing between the surface of slider 20 and the surface of disk 12. Also, head 16 is mounted on slider 20.

Figure 6:
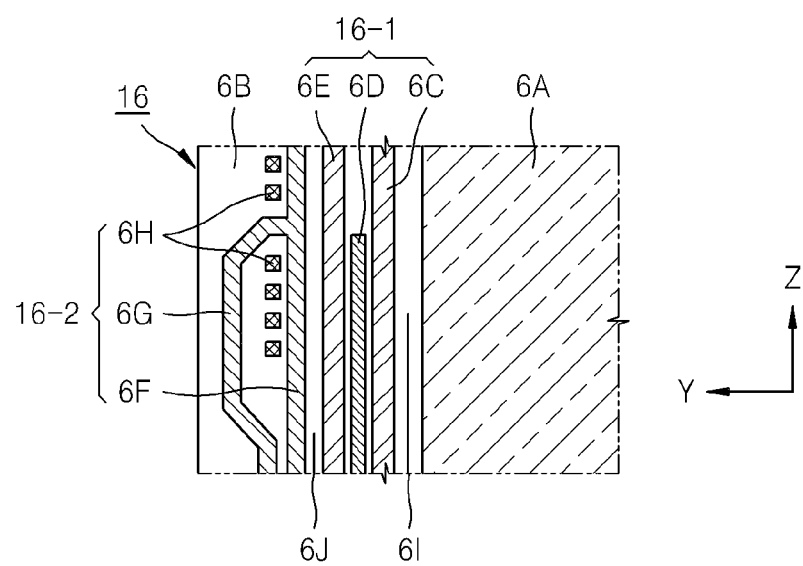
FIG. 6 is a cross-sectional view of a head mounted on the slider of FIG. 5.

FIG. 6 is a cross-sectional view of head 16 mounted on slider 20 taken along a line A-A' in FIG. 5. As shown in FIG. 6, head 16 includes a reader 16-1 and a writer 16-2. In detail, reader 16-1 includes a pair of shields 6C and 6E and an MR device 6D disposed between shields 6C and 6E, and writer 16-2 includes a main pole 6F for applying a magnetic field on disk 12, a return yoke 6G for forming a magnetic path with the main pole 6F, and a coil 6H for inducing the magnetic field at main pole 6F. Also, head 16 is mounted on a slider body 6A which may be formed of AlTiC and surrounded by a protection layer 6B which may be formed of alumina ($Al_2O_3$). Also, a heater 6I for adjusting the flying height of head 16 is mounted on slider 20. When power is supplied to heater 6I mounted on slider 20, a pole tip, i.e., the end of head 16, thermally expands, and thus the flying height of head 16 with respect to the surface of disk 12 is reduced. In other words, the flying height of head 16 changes according to the amplitude of current or voltage supplied to heater 6I.

Also, a sensor 6J having an electric characteristic that changes according to temperature is mounted on slider 20. Sensor 6J may use a material having a resistance value that changes according to temperature, for example, may be a device formed of nickel iron (NiFe). Sensor 6J may be installed at a location of slider 20 that is nearest to the surface of disk 12.

Figure 16:
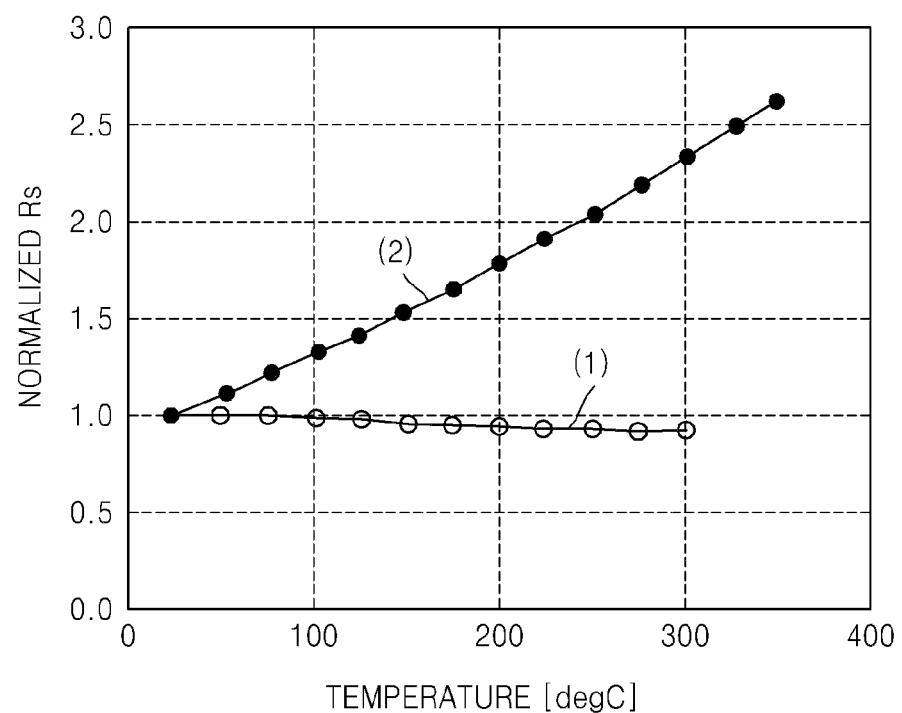
FIG. 16 is a graph showing a resistance value with respect to temperature in a nickel iron (NiFe) device that is used as a sensor installed in a slider.

FIG. 16 is a graph showing a resistance value with respect to temperature in a nickel iron (NiFe) device that is used as sensor 6J installed in slider 20. FIG. 16 illustrates both a changing characteristic plot 2 of the resistance value of the NiFe device according to temperature, and a changing characteristic plot 1 of a resistance value of a tungsten (Tu) MR device according to temperature. Referring to FIG. 16, it is seen that the resistance value of the NiFe device changes according to temperature. In some embodiment, this characteristic of the NiFe device is used to determine a touch-down state and a contacting state between head 16 and storage medium 150 in an operating state of a data storage device, by using a signal detected by sensor 6J. This will be described in detail later.

Referring back to FIG. 3, typically, data is stored in annular tracks 34 of disk 12. Each of the annular tracks 34 includes a plurality of sectors. One track 34 includes servo information fields where servo information is stored and data sectors where data is stored. A plurality of data sectors may be included between the servo information fields. Alternatively, a single data sector may be included between the servo information fields. A preamble, a servo synchronization indication signal, a gray code, and a burst signal are recorded on the servo information fields.

The preamble provides clock synchronization while reading servo information, and also provides a uniform timing margin by providing a gap in front of a servo sector. Also, the preamble is used to determine a gain of an automatic gain control (AGC) circuit.

The servo synchronization indication signal includes a servo address mark (SAM) and a servo index mark (SIM). The SAM is a signal indicating a beginning of a sector, and the SIM is a signal indicating a beginning of a first sector in a track 34.

The gray code provides track information, and the burst signal is a signal used to control head 16 to follow the center of annular track 34. The burst signal may include 4 patterns, such as A, B, C, and D, and these 4 patterns may be combined to generate a position error signal (PES) used while controlling head 16 to follow the center of annular track 34.

Referring back to FIG. 3, a logic block address is allocated in a writable area of disk 12. The logic block address of the disk drive is converted to cylinder/head/sector information to designate the writable area of disk 12. Disk 12 is divided into a maintenance cylinder area that is not accessible by a user, and a data area that is accessible by the user. The maintenance cylinder area is also referred to as a system area. In the maintenance cylinder area, various types of information required to control the disk drive are stored, and in particular, information required to control the flying height of head 16 is stored.

Head 16 is moved across the surface of disk 12 to read data from or write data to various tracks 34. A plurality of code objects for enabling the disk drive to implement various functions may be stored in disk 12. For example, a code object for executing a MP3 player function, a code object for executing a navigation function, and a code object for executing various video games may be stored in disk 12.

Referring back to FIG. 1, the storage medium I/F 140 allows processor 110 to access storage medium 150 to write or read data. In detail, the storage medium I/F 140 in the data storage device, which may be implemented as a disk drive, includes a servo circuit for controlling head disk assembly 100 and a read/write channel circuit for processing a signal to read or write data.

Host I/F 160 performs data transmission/reception to/from host device 170, which may be a personal computer. Host I/F 160 may be any standardized interface, such as a serial advanced technology attachment (SATA) interface, a parallel advanced technology attachment (PATA) interface, or a universal serial bus (USB) interface.

External I/F 180 performs data transmission/reception to/from an external device via an input/output terminal installed in the data storage device. Examples of the external I/F 180 include any standardized interface, such as an accelerated graphics port (AGP) interface, a USB interface, an IEEE1394 interface, a personal computer memory card international association (PCMCIA) interface, a local area network (LAN) interface, a Bluetooth interface, a high definition multimedia interface (HDMI), a programmable communication interface (PCI), an industry standard architecture (USA) interface, a peripheral component interconnect-express (PCI-E) interface, an Express Card interface, an SATA interface, a PATA interface, or a serial interface.

Bus 190 transfers data between the elements of the data storage device.

Hereinafter, a software operation system of a hard disk drive (HDD), which is an example of the data storage device, will be described with reference to FIG. 2.

Figure 2:
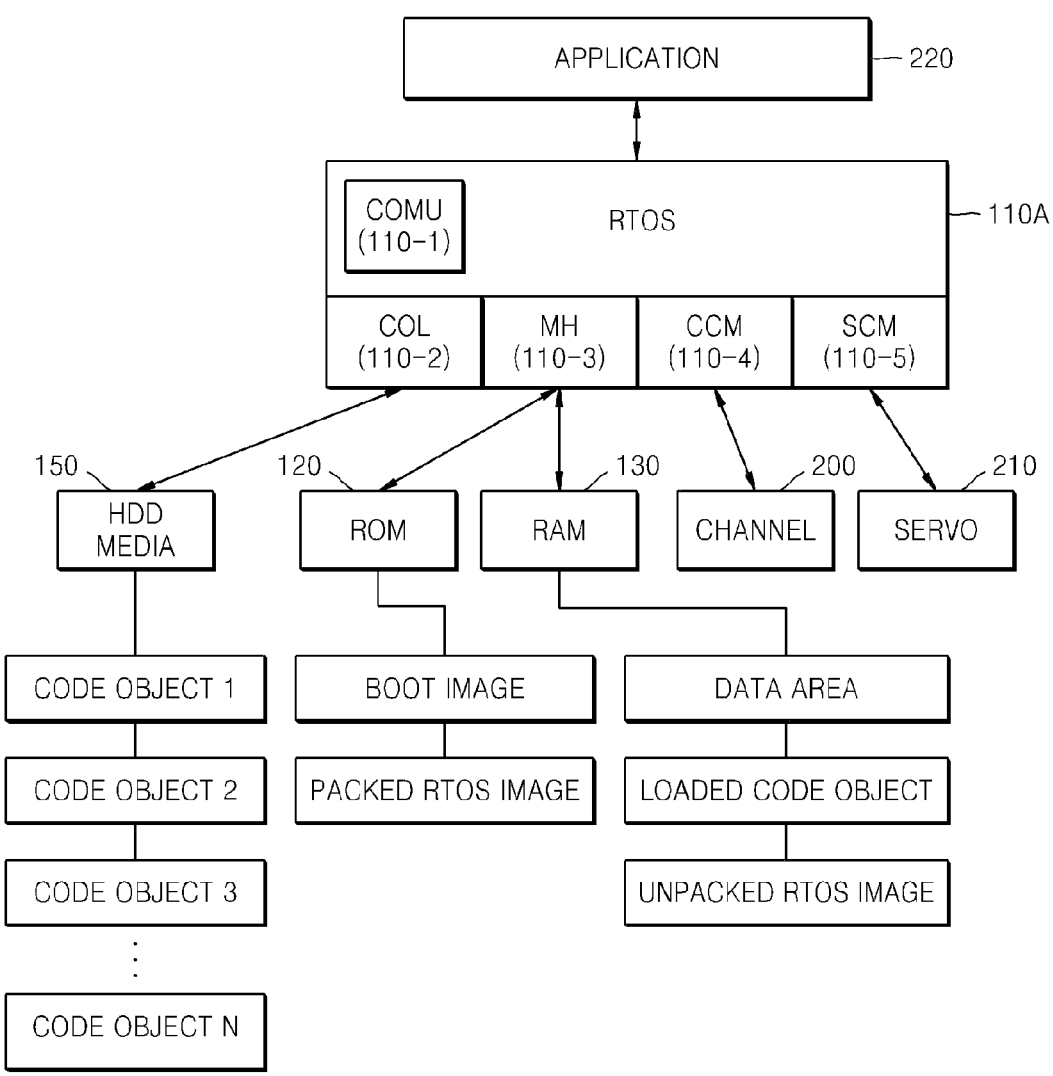
FIG. 2 illustrates an operation system of software of the data storage device of FIG. 1.

FIG. 2 illustrates a software operation system of the data storage device of FIG. 1. Referring to FIG. 2, a plurality of code objects 1 through N are stored in storage medium 150 of the HDD.

In ROM 120, a boot image and a packed real time operating system (RTOS) image are stored.

In detail, the plurality of code objects 1 through N are stored in storage medium 150, e.g., a disk, of the HDD. The code objects 1 through N stored in the disk may include not only code objects required for operating the disk drive but also code objects relevant to various extendible functions of the disk drive. In particular, the code objects for executing the methods of detecting a touch-down and contact between a head and storage medium 150 by using a sensor illustrated in FIGS. 12 through 15 are also stored in the disk. Alternatively, the code objects for executing the methods illustrated in FIGS. 12 through 15 may also be stored in ROM 120, instead of the disk used as storage medium 150 of the HDD. Also, code objects for executing various functions such as a MP3 player function, a navigation function, a video game function, or the like may also be stored in the disk.

An unpacked RTOS image obtained by reading a boot image from ROM 120 is loaded into RAM 130 while booting the disk drive. Then, code objects required for operating host I/F 160 and external I/F 180 and stored in storage medium 150 of the HDD are loaded into RAM 130. Obviously, a data area for storing data is also allocated in RAM 130.

Circuits required for processing a signal to read or write data are installed in a channel circuit 200, and circuits required for controlling the head disk assembly 100 to read or write data are installed in a servo circuit 210.

An RTOS 110A is a real-time operation system program, e.g., a multiple program operating system using a disk. Depending on tasks, real-time multi-processing is performed on relatively high priority foreground tasks, and batch-processing is performed on relatively low priority background tasks. In addition, RTOS 110A loads code objects to the disk or unloads code objects therefrom.

RTOS 110A manages a code object management unit (COMU) 110-1, a code object loader (COL) 110-2, a memory handler (MH) 110-3, a channel control module (CCM) 110-4, and a servo control module (SCM) 110-5 to execute tasks according to requested commands. Also, RTOS 110A manages application programs 220.

In detail, RTOS 110A loads into RAM 130 code objects required for controlling the disk drive when the disk drive is booted. Thus, after the execution of the booting process, the disk drive may be operated by using the code objects loaded into RAM 130.

COMU 110-1 stores position information about where code objects are written, converts virtual addresses into actual addresses, and performs a bus arbitration process. COMU 110-1 also stores information about priorities of tasks being executed. COMU 110-1 also manages task control block (TCB) information and stack information required for executing tasks regarding code objects.

COL 110-2 loads the code objects stored in storage medium 150 of the HDD into RAM 130 by using COMU 110-1, or unloads the code objects stored in RAM 130 to storage medium 150 of the HDD. Thus, COL 110-2 may load the code objects for executing the methods of FIGS. 12 through 15 and stored in storage medium 150 of the HDD into RAM 130.

Thus, RTOS 110A may execute the methods of FIGS. 12 through 15 by using the code objects loaded into RAM 130, which will be described below.

MH 110-3 writes data to, or reads data from, ROM 120 or RAM 130.

CCM 110-4 performs channel control required for processing a signal to write or read data. SCM 110-5 controls a servo system, including the head disk assembly 100 for reading/writing data.

Figure 4:
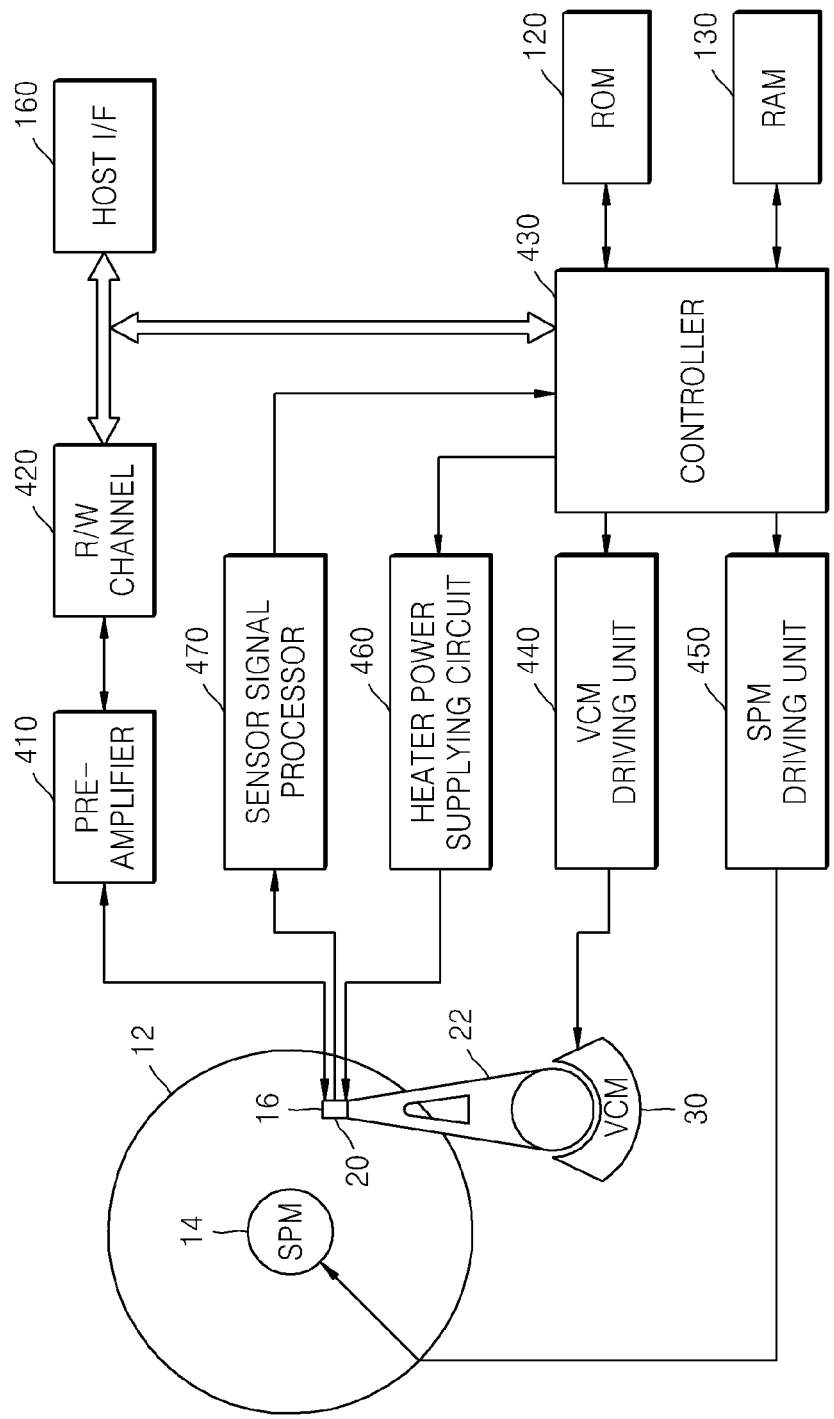
FIG. 4 is a diagram of one example embodiment of a disk drive.

FIG. 4 illustrates an example embodiment of a configuration of a disk drive, as an example of the data storage device of FIG. 1.

Referring to FIG. 4, the disk drive includes a pre-amplifier (pre-amp) 410, a read/write (R/W) channel 420, a controller 430, a voice coil motor (VCM) driving unit 440, a spindle motor (SPM) driving unit 450, a heater power supplying circuit 460, a sensor signal processor 470, ROM 120, RAM 130, and host I/F 160. Here, the sensor signal processor 470 may be designed to be included in the same printed circuit board (PCB) or integrated circuit chip as pre-amplifier 410.

First, a data read operation and a data write operation for a general disk drive will be described below.

In a data read mode, pre-amplifier 410 amplifies an electrical signal sensed from disk 12 by head 16. Then, R/W channel 420 amplifies the electrical signal output from the pre-amplifier 410 by using an automatic gain control circuit (not shown) that automatically varies a gain according to an amplitude of the electrical signal, converts the electrical signal into a digital signal, and then decodes the digital signal to detect data. For example, an error correction process may be performed on the detected data by controller 430 by using a Reed-Solomon code, which is an error correcting code, and then the detected data may be converted into stream data and transmitted to host device 170 via host I/F 160.

Next, in a write mode, the disk drive receives data from host device 170 via host I/F 160, and controller 430 adds an error correction symbol(s) using a Reed-Solomon code, and R/W channel 420 encodes the data to be suitable for a write channel. Then, the data is written to disk 12 by head 16 to which a write current amplified by pre-amplifier 410 is applied.

Figure 7:
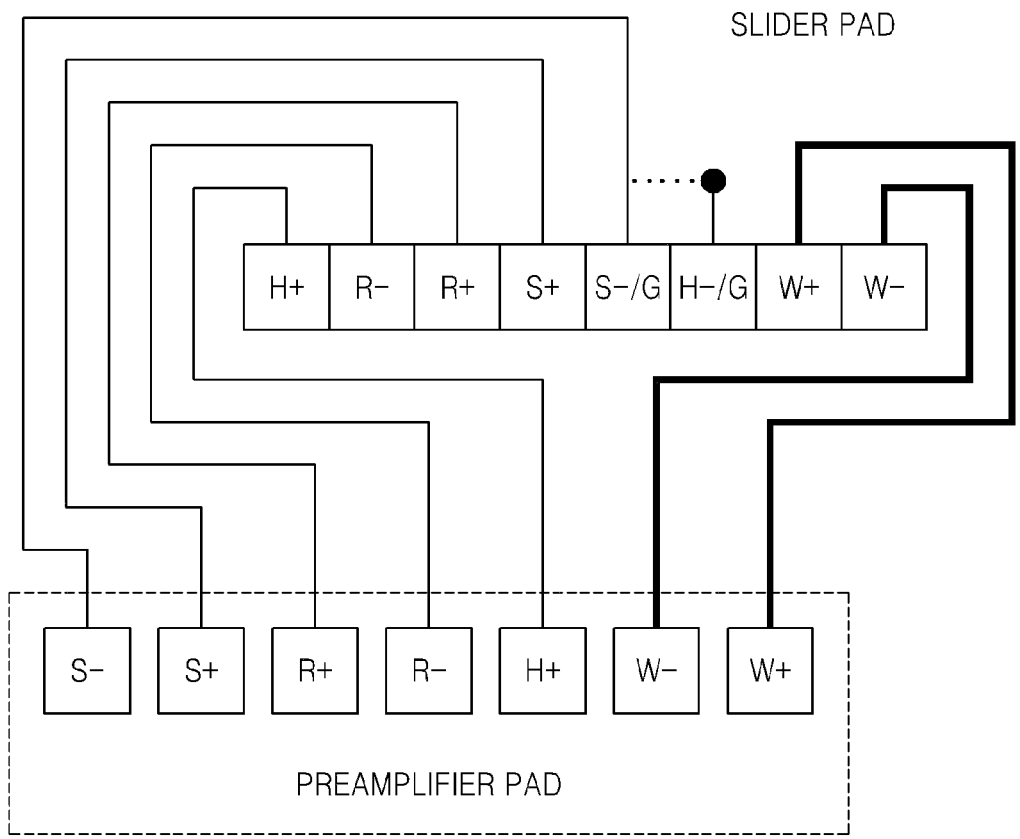
FIG. 7 is a wiring diagram of an example embodiment of pads of a slider and a preamplifier in a disk drive.

FIG. 7 is a wiring diagram of an example embodiment of pads of slider 20 and pre-amplifier 410 in the disk drive, wherein a connection relationship of electrical signals is shown. Slider 20 includes 2 pads H+ and H−/G that are respectively connected to two terminals of heater 6I, 2 pads W+ and W− that are connected to coil 6H of writer 16-2, 2 pads R+ and R− that are respectively connected to 2 terminals of MR device 6D of reader 16-1, and 2 pads S+ and S−/G that are respectively connected to 2 terminals of sensor 6J. Here, the pads H−/G and S−/G may be integrated into a single pad as a ground terminal.

Heater power supplying circuit 460 supplies power corresponding to a FOD DAC value applied from controller 430 to heater 6I installed on slider 20. Here, a FOD DAC is a control signal for adjusting the flying height of head 16, and determines the amplitude of a voltage or current applied to heater 6I.

Heater power supplying circuit 460 generates a current according to the FOD DAC value and supplies the generated current to heater 6I installed on slider 20 in an FOD on mode, and blocks the current supplied to heater 6I in an FOD off mode.

Sensor signal processor 470: separates a voltage signal across sensor 6J according to the resistance value of sensor 6J or a current signal flowing through sensor 6J into a direct current (DC) component and an alternating current (AC) component while applying a current or a voltage respectively generated by a constant current source or a constant voltage source to sensor 6J; uses the DC component to detect the touch-down state of head 16 for determining the FOD DAC value corresponding to a target flying height of head 16 by using the DC component; and performs a signal process to detect the contacting state of head 16 and disk 12 in an operating state of the disk drive by using the AC component. Here, an operating state of the disk drive means a regular user operation of the disk drive, such as reading data from the disk drive or writing data to the disk drive, and is distinguished from a test mode, such a touch-down test for the disk drive.

Figure 8:
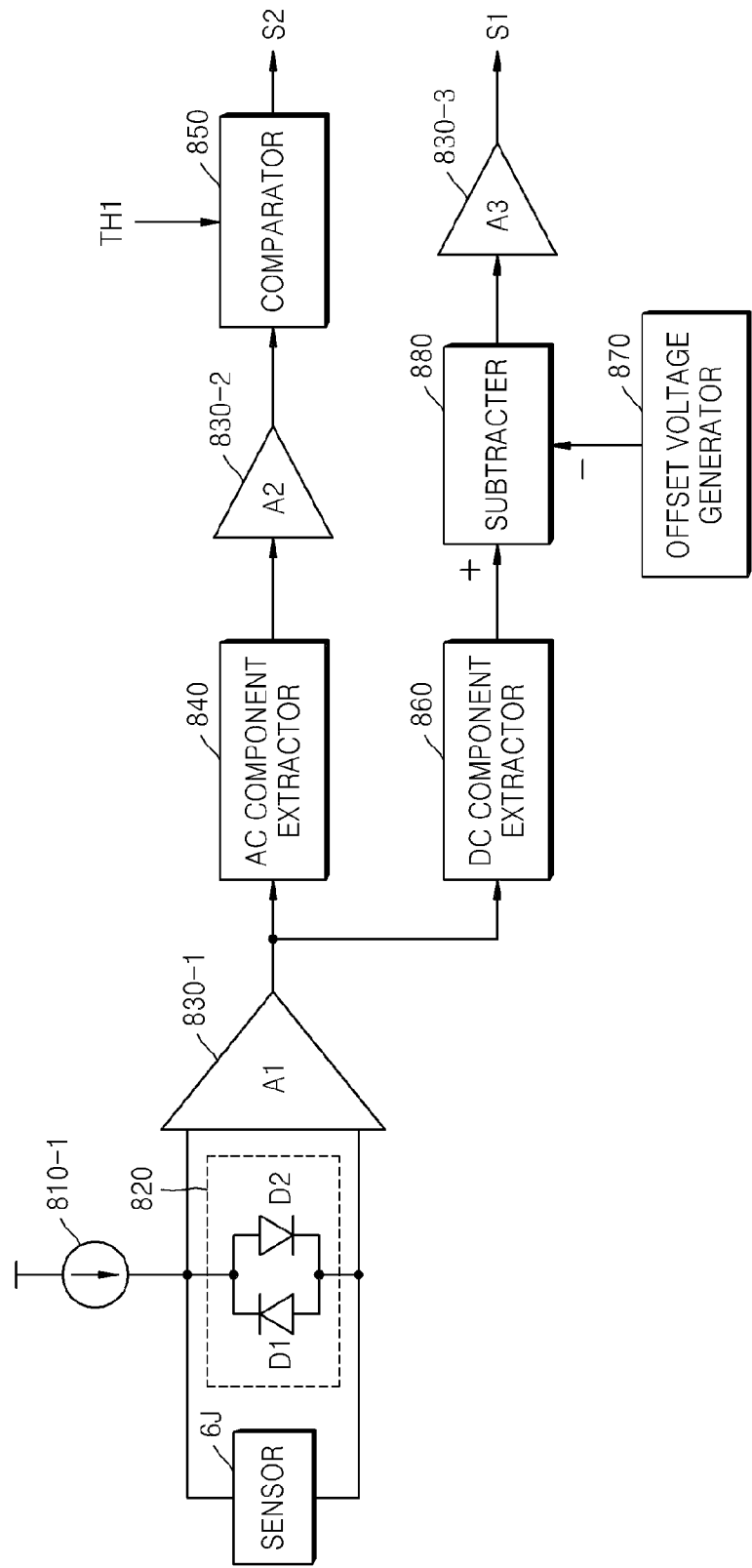
FIG. 8 is a structural diagram of an example embodiment of an apparatus for detecting a touch-down and contact between a head and a storage medium by using a sensor.

FIG. 8 is a circuit diagram illustrating in detail an example embodiment of sensor signal processor 470.

As illustrated in FIG. 8, sensor signal processor 470 includes a constant current source 810-1, an overvoltage prevention circuit 820, first through third amplifiers 830-1 through 830-3, an AC component extractor 840, a comparator 850, a DC component extractor 860, an offset voltage generator 870, and a subtractor 880.

Constant current source 810-1 generates a constant current, and supplies the constant current to sensor 6J.

The overvoltage prevention circuit 820 includes 2 diodes D1 and D2, and prevents a diode conduction voltage, such as 0.7 V or greater across two terminals of sensor 6J.

As described above, sensor 6J is installed to slider 20 and has a resistance value that changes according to temperature. The constant current flows through sensor 6J due to constant current source 810-1, and thus a voltage between the two terminals of sensor 6J changes according to the resistance value of sensor 6J.

For reference, an ambient temperature of the sensor 6J changes according to the intensity of power supplied to heater 6I or the flying height of head 16 on disk 12. Accordingly, the resistance value of sensor 6J changes according to the flying height of head 16, and such a change of the resistance value changes a voltage between the two terminals of sensor 6J.

First amplifier 830-1 amplifies a voltage signal between the 2 terminals of sensor 6J according to a gain A1.

AC component extractor 840 is a circuit that separates and outputs an AC component from an output signal of first amplifier 830-1, and may include, for example, a high pass filter or a band pass filter. The AC component output by AC component extractor 840 is used to detect the contacting state between head 16 and storage medium 150 in an operating state of the disk drive. In other words, the AC component may be used to detect thermal asperity (TA) during normal disk drive operation.

DC component extractor 860 is a circuit that separates and outputs a DC component from the output signal of first amplifier 830-1, and may include, for example, a low pass filter. The DC component output by DC component extractor 860 is used to detect the touch-down state of head 16 during a touch-down test for adjusting the flying height of head 16.

Second amplifier 830-2 amplifies the AC component output by AC component extractor 840 according to a gain A2, and outputs the amplified signal to comparator 850.

Comparator 850 compares the amplitude of the amplified signal of the AC component and the first threshold value TH1, and generates a signal S2 for indicating the contacting state between head 16 and storage medium 150 when the amplitude of the amplified signal is equal to or greater than the first threshold value TH1. The first threshold value TH1 is a reference value for detecting the contacting state while a data storage device (e.g., a disk drive) is in an operating state, and may be determined through tests while designing the disk drive.

Here, contact between head 16 and storage medium 150 while in an operating state occurs due to an abnormal flying height of head 16, or dirt or the like on disk 12. When head 16 and storage medium 150 contact each other while in an operating state, TA may occur. In other words, detection of the contact between head 16 and storage medium 150 while in an operating state may also be referred to as TA detection.

Offset voltage generator 870 generates an offset voltage so as to reduce the DC component output from the DC component extractor 860. The amplitude of the offset voltage is set to be smaller than the amplitude of a minimum DC component output from the DC component extractor 860, and is set in such a way that a variable range of a signal output by the third amplifier 830-3 is included in an input range of an analog-to-digital converter (ADC) 910 of FIGS. 10 and 11 that is to be connected to the output of the third amplifier 830-3.

Subtractor 880 outputs an offset compensated DC component obtained by subtracting the offset voltage output by offset voltage generator 870 from the DC component received from DC component extractor 860.

Third amplifier 830-3 amplifies the offset compensated DC component output from subtractor 880 according to a gain A3, and outputs a signal 51 corresponding to the amplified offset compensated DC component.

Figure 18:
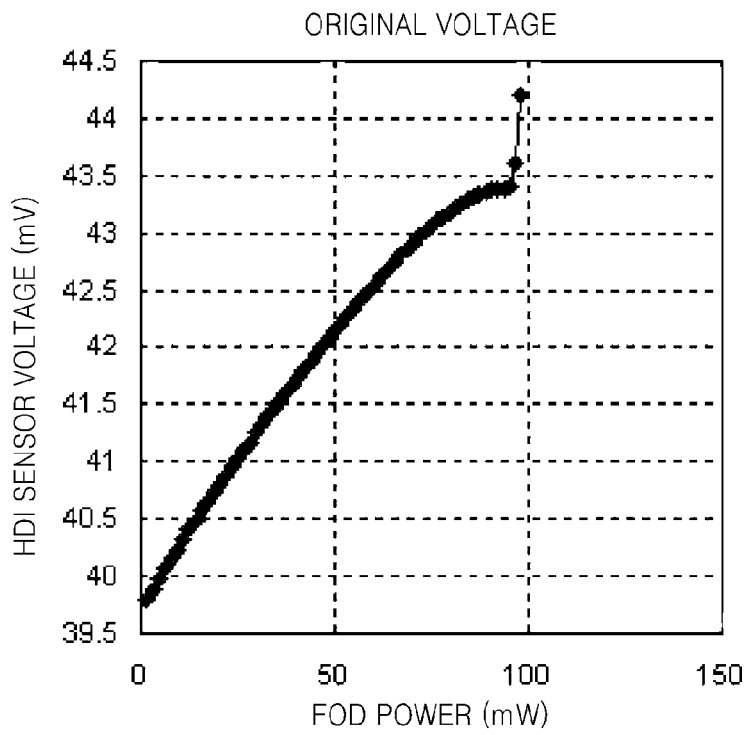
FIG. 18 is a graph showing a change of voltage detected by a sensor with respect to power supplied to a heater installed in a slider when a constant current of 1 mA is supplied to the sensor, according to an example embodiment.

For example, when a constant current of 1 mA flows from the constant current source 810-1 through sensor 6J, and the gain A1 of first amplifier 830-1 is set to be 1, the output voltage of first amplifier 830-1 according to the intensity of the power FOD POWER supplied to heater 6I is measured as shown in FIG. 18. Referring to FIG. 18, in an example embodiment voltages of sensor 6J when the power FOD POWER is not supplied to heater 6I, and when a touch-down state of head 16 has occurred are different by about 4 mV.

Figure 20:
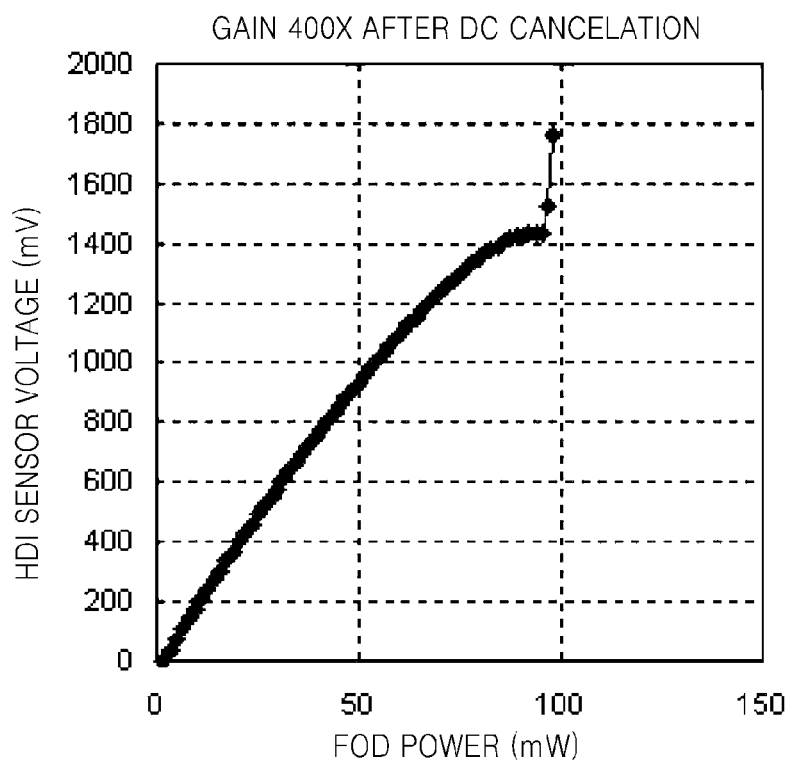
FIG. 20 is a graph showing a result of compensating for an offset of a voltage signal detected by a sensor and then amplifying the voltage signal by 400 times with respect to power supplied to a heater installed in a slider, when a constant current of 1 mA is supplied to the sensor, according to an example embodiment.

Also, in an example embodiment, when the offset voltage is set to be 38.9 mV and the gain A3 of third amplifier 830-3 is set to be 400, the output voltage of third amplifier 830-3 as a function of the intensity of the power FOD POWER supplied to heater 6I is measured to be as shown in FIG. 20.

Figure 19:
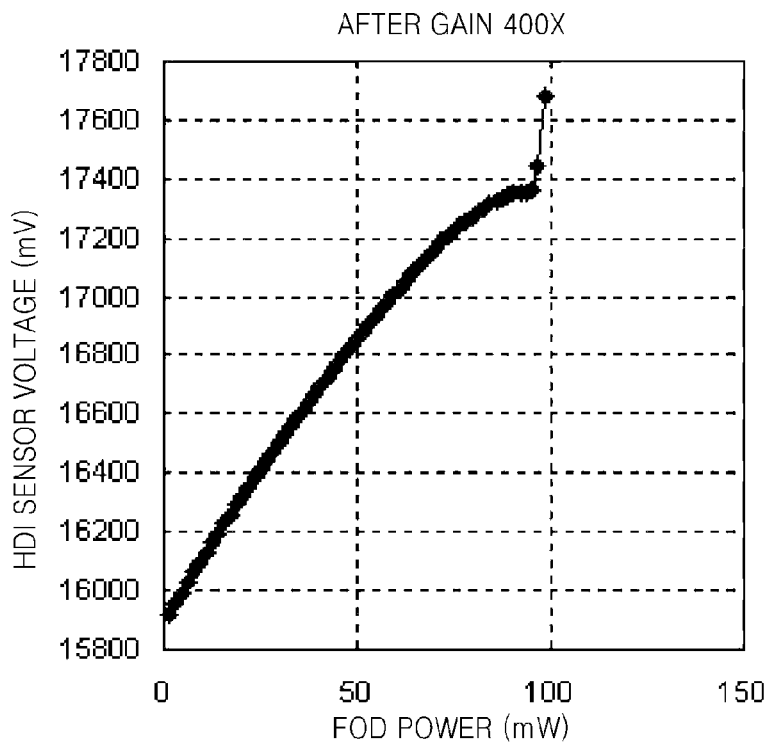
FIG. 19 is a graph showing a result of amplifying a voltage signal detected by a sensor by 400 times with respect to power supplied to a heater installed in a slider when a constant current of 1 mA is supplied to the sensor, according to an example embodiment.

When offset compensation is not performed, i.e. by setting the offset voltage as 0 V, the output voltage of third amplifier 830-3 is measured to be as shown in FIG. 19. Referring to FIG. 19, it is seen that the output voltage of the third amplifier 830-3 changes by 1.8 V, from about 15.9 to about 17.7 V as the FOD POWER changes from 0 to 100 mW. This is only an example, and the output voltage may stray far from the input range, e.g., 0 to 2 V, of the ADC 910.

Figure 21:
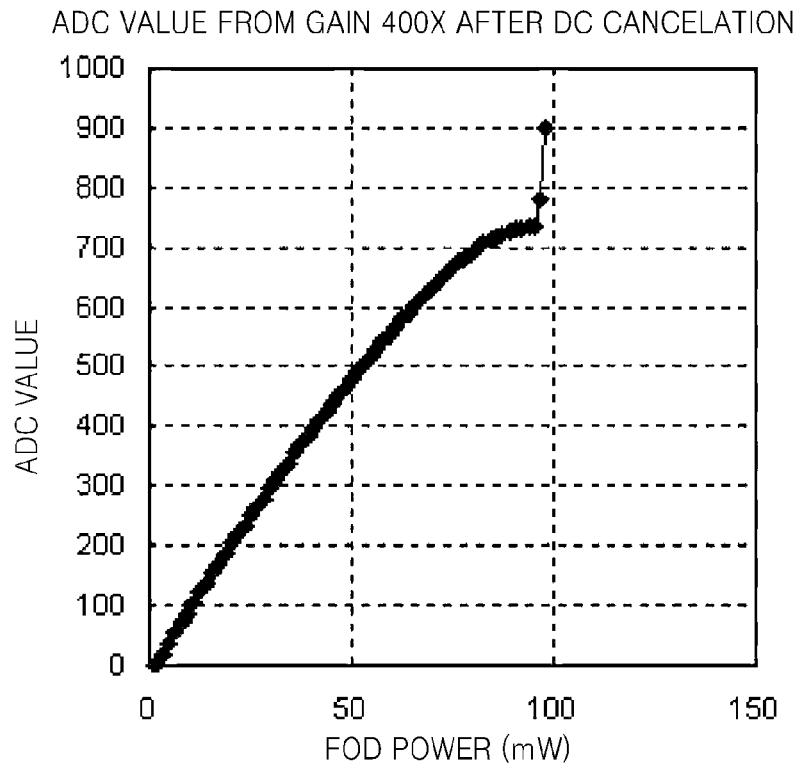
FIG. 21 is a graph showing a result of converting an analog signal into a digital signal with respect to power supplied to a heater installed in a slide when a constant current of 1 mA is supplied to the sensor, wherein the analog signal is obtained by compensating for an offset of a voltage signal detected by the sensor and then amplifying the voltage signal by 400 times, according to an example embodiment.
Figure 22:
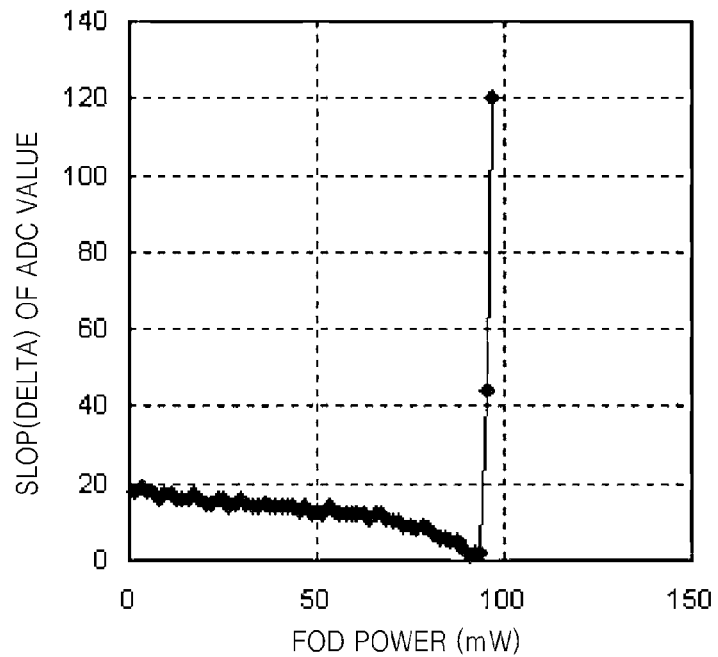
FIG. 22 is a graph showing a change rate of a result of converting an analog signal into a digital signal with respect to power supplied to a heater installed in a slide when a constant current of 1 mA is supplied to the sensor, wherein the analog signal is obtained by compensating for an offset of a voltage signal detected by the sensor and then amplifying the voltage signal by 400 times, according to an example embodiment.

However, when subtractor 880 performs offset compensation by using the offset voltage of 38.9 mV, the output voltage of third amplifier 830-3 changes to a range from 0 to 1.8V as shown in FIG. 20. FIG. 21 is a graph showing a value obtained by analog-to-digital conversion of the output signal of third amplifier 830-3 by using the ADC 910, representing an input range of 0 to 2 V by 10 bits. Also, FIG. 22 is a graph showing a change rate of the value digital-converted by the ADC 910.

As such, the sensitivity of sensor 6J may be compensated for through offset compensation and amplification.

Figure 9:
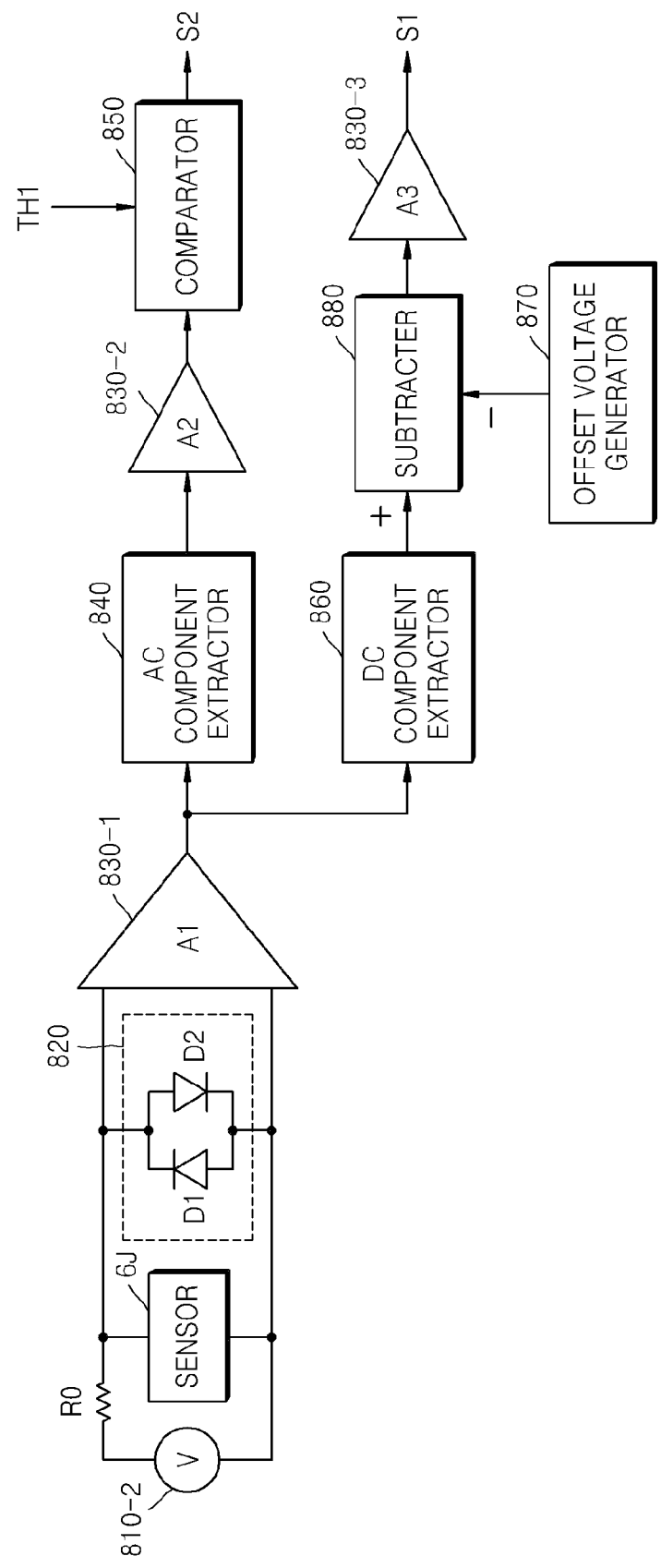
FIG. 9 is a structural diagram of another example embodiment of an apparatus for detecting a touch-down and contact between a head and a storage medium by using a sensor.

FIG. 9 is a circuit diagram illustrating in detail another example embodiment of the sensor signal processor 470.

As shown in FIG. 9, sensor signal processor 470 includes a constant voltage source 810-2, overvoltage prevention circuit 820, first through third amplifiers 830-1, 830-2, and 830-3, AC component extractor 840, comparator 850, DC component extractor 860, offset voltage generator 870, subtractor 880, and resistor R0.

The embodiment of the sensor signal processor of FIG. 8 and the embodiment of the sensor signal processor of FIG. 9 are different from each other since the sensor signal processor of FIG. 8 uses the constant current source 810-1, whereas the sensor signal processor of FIG. 9 uses the constant voltage source 810-2.

In other words, when constant voltage source 810-2, the resistor R0, and the sensor 6J are connected in series, and two input terminals of first amplifier 830-1 are respectively connected to two terminals of the sensor 6J, a voltage change of the sensor 6J according to a change of the resistance value of the sensor 6J may be measured at an output terminal of first amplifier 830-1.

A voltage generated by constant voltage source 810-2 is the sum of a voltage across the resistor R0 and a voltage across the sensor 6J. However, since an input resistance value of first amplifier 830-1 and a resistance value of overvoltage prevention circuit 820 are very large compared to the resistance value of the sensor 6J, the parallel combination of the resistance value of the sensor 6J, the resistance value of overvoltage prevention circuit 820, and the input resistance value first amplifier 830-1 is similar to the resistance value of the sensor 6J.

Also, since constant voltage source 810-2, the resistor R0 having a fixed resistance value, and the sensor 6J are connected in series, when the resistance value of the sensor 6J changes, a voltage between the two terminals of the sensor 6J is changed. Accordingly, the change of the resistance value of the sensor 6J may be measured by using the voltage across the sensor 6J.

Overvoltage prevention circuit 820, first through third amplifiers 830-1, 830-2, and 830-3, AC component extractor 840, comparator 850, DC component extractor 860, offset voltage generator 870, and subtractor 880 of FIG. 9 are identical to those of FIG. 8, and thus details thereof are not be repeated.

Referring back to FIG. 4, controller 430 may be a digital signal processor (DSP), a microprocessor, a microcontroller, a processor, or the like. Controller 430 controls R/W channel 420 to read data from disk 12 or to write data to disk 12 according to a command received from host device 170 via host I/F 160.

Controller 430 is coupled to VCM driving unit 440, which supplies a driving current to drive VCM 30. Controller 430 supplies a control signal to VCM driving unit 440 to control movement of head 16.

Also, controller 430 is coupled to SPM driving unit 450, which supplies a driving current for driving SPM 14. When power is supplied to controller 430, controller 430 supplies a control signal to SPM driving unit 450 to rotate SPM 14 at a target speed.

Controller 430 is connected to heater power supplying circuit 460, and generates an FOD DAC value, i.e., a control signal for determining the amplitude of a voltage or current to be supplied to heater 6I installed to slider 20. Also, controller 430 detects the touch-down state by using the signals S1 and S2 generated by sensor signal processor 470, and determines or adjusts the FOD DAC value.

Controller 430 is coupled to ROM 120 and RAM 130. In ROM 120, firmware and control data for controlling the disk drive may be stored. Also, program codes and data for executing the methods of FIGS. 12 through 15 may be stored in ROM 120. However, the program codes and data for executing the methods of FIGS. 12 through 15 may also be stored in the maintenance cylinder area of the disk 12, instead of in ROM 120.

Controller 430 may load into RAM 130 the program codes and data for executing the methods of FIGS. 12 through 15 that is stored in ROM 120 or disk 12, and may control the elements of the disk drive to execute those methods by using the program codes and data loaded into RAM 130.

Figure 10:
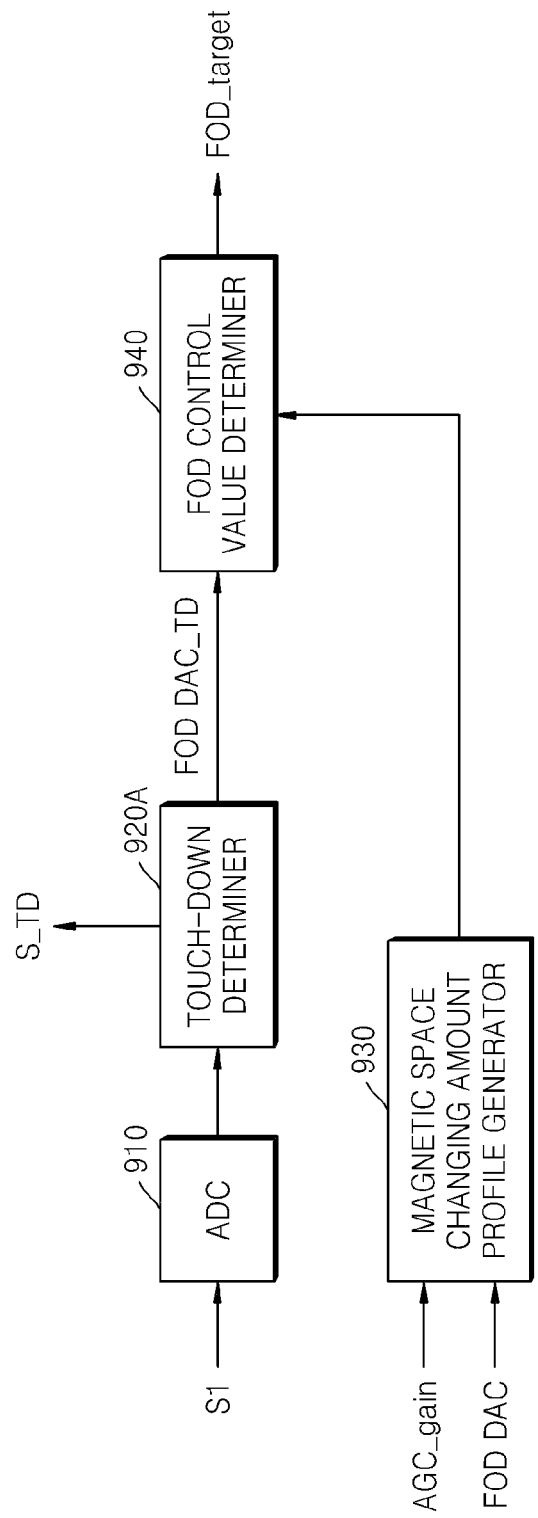
FIG. 10 is a structural diagram of an apparatus for determining a touch-down and for adjusting a flying height of a head by using a sensor, according to an embodiment of the inventive concept.
Figure 11:
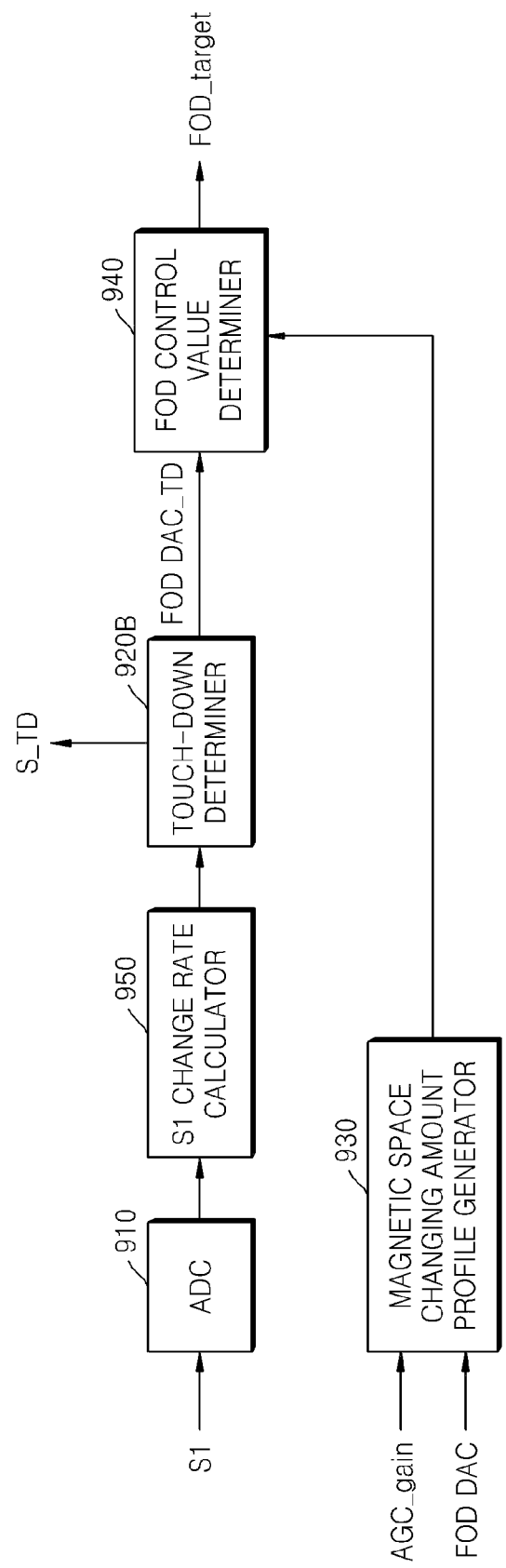
FIG. 11 is a structural diagram of another example embodiment of an apparatus for determining a touch-down and for adjusting a flying height of a head by using a sensor.

Also, controller 430 may determine the touch-down of head 16 and adjust the flying height of head 16 by using the signals S1 and S2 generated by sensor signal processor 470. In other words, a circuit of an apparatus for determining a touch-down and for adjusting a flying height of a head, according to an embodiment as illustrated in FIG. 10 or 11 may be designed to be embedded in controller 430. Alternatively, the circuit of the apparatus of FIG. 10 or 11 may be separated from controller 430. Alternatively, a part of or the entire circuit of the apparatus of FIG. 10 or 11 may be integrated to sensor signal processor of FIG. 8 or 9.

FIG. 10 is a structural diagram of an example embodiment of an apparatus for determining a touch-down and for adjusting a flying height of a head.

As shown in FIG. 10, the apparatus includes an ADC 910, a touch-down determiner 920A, a magnetic space changing amount profile generator 930, and an FOD control value determiner 940.

ADC 910 converts the analog signal S1 processed on the DC component path of the sensor signal processor of FIG. 8 or 9 into a digital signal while sequentially increasing FOD DAC values applied to heater power supplying circuit 460 in a touch-down test mode. A DC component digital-converted by ADC 910 in the touch-down test mode is illustrated in FIG. 21.

Touch-down determiner 920A compares a value V_DC of the DC component digital-converted by ADC 910 and the second threshold value TH2, and when the value V_DC is greater than or equal to the second threshold value TH2, generates a signal S_TD indicating that head 16 has reached a touch-down location, and at the same time, determines the applied FOD DAC value as a touch-down reference value, FOD DAC_TD. Here, the second threshold value TH2 is a value of a voltage of the sensor 6J corresponding to a threshold resistance value of the sensor 6J for determining a touch-down point of time at which slider 20 and disk 12 contact each other, and may be experimentally determined while developing the disk drive considering the changing resistance value characteristics of the sensor 6J according to temperature.

Figure 17:
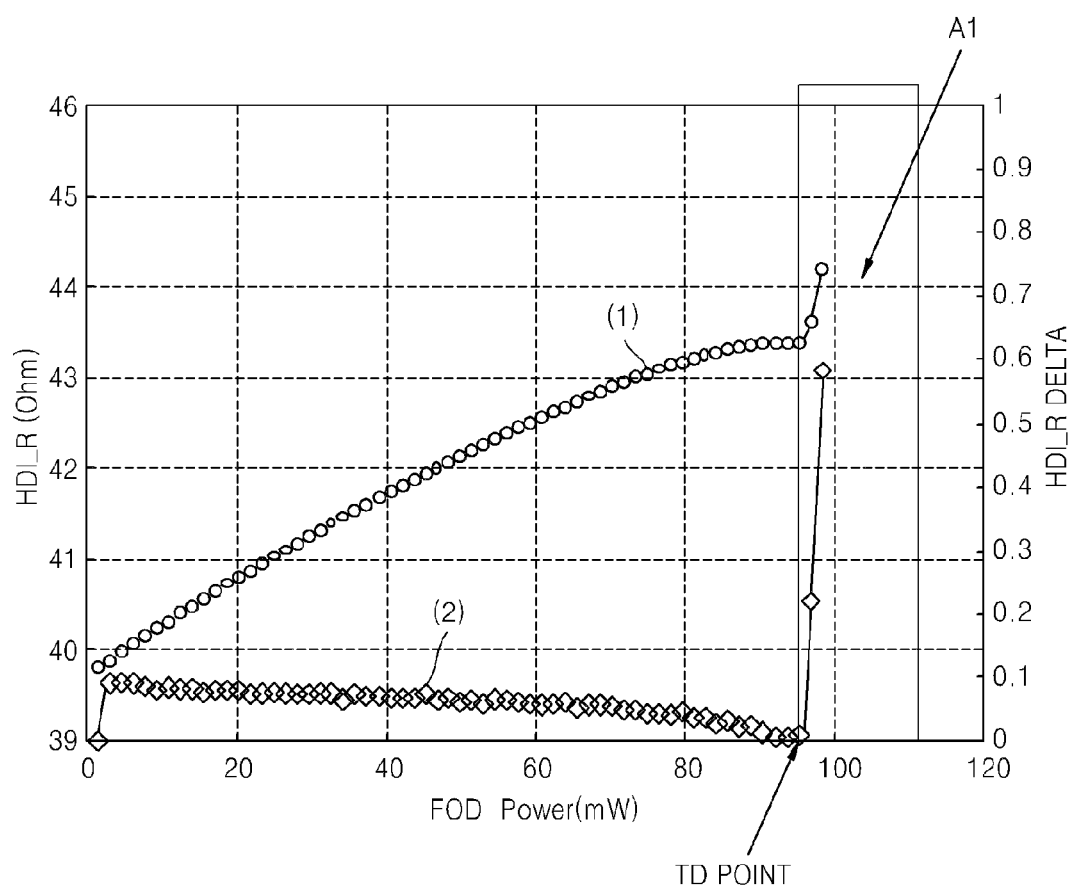
FIG. 17 is a graph showing a change of a resistance value of a sensor and a change rate according to power supplied to a heater installed in a slider, according to an example embodiment.

A method of determining the second threshold value TH2 will now be described in detail with reference to FIG. 17. FIG. 17 shows a plot (1) indicating a change of a resistance value HDI_R of the sensor 6J according to the value of the power FOD POWER supplied to the heater 6I installed on slider 20. Looking at the plot (1) of FIG. 17, the resistance value HDI_R of the sensor 6J gradually increases as the value of the power FOD POWER increases, and the resistance value HDI_R remarkably increases in an area A1 after the head 16 reaches a touch-down point TD POINT. Accordingly, the touch-down point TD POINT where the resistance value HDI_R starts to remarkably increase corresponds to a point where the digital-converted value of the DC component remarkably changes in FIG. 21. Thus, the second threshold value TH2 may be determined through experiments by obtaining the point where the digital-converted value of the DC component remarkably changes. The second threshold value TH2 may be set according to the temperature at which the disk drive is used.

When the signal S_TD is generated, the touch-down process is completed.

The magnetic space changing amount profile generator 930 calculates a changing amount profile of a magnetic space between head 16 and disk 12 according to a change of the FOD DAC value. For example, the changing amount of the magnetic space between head 16 and disk 12 may be used to obtain a profile of the flying height of head 16 on disk 12 according to a change of the FOD DAC value by using a well known Wallace spacing loss equation.

The Wallace spacing loss equation is shown as Equation (1) as:

$$\Delta d = (\lambda/2\pi) * Ls \quad (1)$$

Here, $\Delta d$ denotes a changing amount of a magnetic space between disk 12 and head 16, $\lambda$ denotes a recording wavelength, i.e., a linear speed/recording frequency, Ls denotes Ln(TAA1/TAA2), wherein Ln denotes a natural log, TAA1 denotes a previous AGC gain value, and TAA2 denotes a current AGC gain value.

Accordingly, the changing amount of the magnetic space between disk 12 and head 16 with respect to a change of an AGC gain value AGC_gain may be obtained by using Equation (1). For reference, since the AGC gain values AGC_gain according to a change of the FOD DAC values are measured, a profile of the changing amount of the magnetic space between disk 12 and head 16 according to the change of the FOD DAC value may be obtained.

FOD control value determiner 940 determines an FOD DAC value (FOD_target) corresponding to a target reference height for head 16 based on the profile obtained by magnetic space changing amount profile generator 930 based on the value FOD DAC_TD received from touch-down determiner 920A.

Accordingly, controller 430 controls the flying height of head 16 to reach the target flying height by applying the value FOD_target determined by FOD control value determiner 940 as the FOD DAC value.

FIG. 11 is a structural diagram of another example embodiment of an apparatus for determining a touch-down and for adjusting a flying height of a head 16.

As shown in FIG. 11, the apparatus includes ADC 910, a touch-down determiner 920B, magnetic space changing amount profile generator 930, FOD control value determiner 940, and an S1 change rate calculator 950.

ADC 910 converts the analog signal S1 processed on the DC component path of the sensor signal processor of FIG. 8 or 9 into a digital signal while sequentially increasing FOD DAC values applied to heater power supplying circuit 460 in a touch-down test mode.

The S1 change rate calculator 950 calculates a change rate of a value of the digital signal converted in ADC 910. In other words, an S1 change rate DELTA_V_DC may be obtained by dividing a changing amount of a digital conversion value of the analog signal S1 processed on the DC component path of sensor signal processor 470 according to a change of the power FOD POWER supplied to the heater 6I. Alternatively, the S1 change rate DELTA_V_DC may be obtained by dividing the changing amount of the digital conversion value by a changing amount of the FOD DAC value applied in heater power supplying circuit 460. An example of the S1 change rate DELTA_V_DC calculated by S1 change rate calculator 950 is shown in FIG. 22.

Touch-down determiner 920B compares the S1 change rate DELTA_V_DC calculated by S1 change rate calculator 950 and a third threshold value TH3, and when the S1 change rate DELTA_V_DC is less than or equal to the third threshold value TH3, generates the signal S_TD indicating that head 16 reached the touch-down location, and at the same time, determines the applied FOD DAC value as a touch-down reference value FOD_DAC_TD. Here, the third threshold value TH3 is a threshold change rate of the analog signal S1 for determining a touch-down point of time at which slider 20 and disk 12 contact each other, and may be experimentally determined while developing the disk drive considering the changing resistance value characteristics of the sensor 6J according to temperature.

A method of determining the third threshold value TH3 will now be described in detail with reference to FIG. 17. FIG. 17 shows a plot (2) indicating a resistance change rate HDI_R Delta of the sensor 6J according to a change of the value of the power FOD POWER supplied to the heater 6I mounted on the slider 20. Looking at the plot (2), the resistance change rate HDI_R Delta of the sensor 6J gradually decreases as the value of the power FOD POWER increases, the resistance change rate HDI_R Delta is zero when the head 16 reaches a touch-down point, and the resistance change rate HDI_R Delta remarkably increases in an area A1 after the touch-down point. Accordingly, when the resistance change rate HDI_R Delta becomes zero at the touch-down point, the S1 change rate DELTA_V_DC, i.e., the change rate of the DC component of the voltage signal of the sensor 6J also becomes zero. Thus, the third threshold value TH3 may be set to zero.

Magnetic space changing amount profile generator 930 calculates a profile of a changing amount of a magnetic space between head 16 and disk 12 according to change of the FOD DAC value. Magnetic space changing amount profile generator 930 of FIG. 11 is identical to that of FIG. 10, and thus details thereof are not repeated.

FOD control value determiner 940 determines a FOD DAC value FOD_target corresponding to a target flying height for head 16 from the profile obtained by magnetic space changing amount profile generator 930 based on the value FOD DAC_TD received from touch-down determiner 920B.

Accordingly, controller 430 may control the flying height of head 16 to reach the target flying height by applying the value FOD_target determined by FOD control value determiner 940 as the FOD DAC value.

Hereinafter, methods of detecting a touch-down and contact between a head and a storage medium by using a sensor will be described with reference to FIGS. 12 through 15, wherein the methods are performed by processor 110 of the data storage device of FIG. 1, or controller 430 of the disk drive of FIG. 4. For convenience of description, the method is described as being performed by controller 430 herein, but may be performed by another device.

Figure 12:
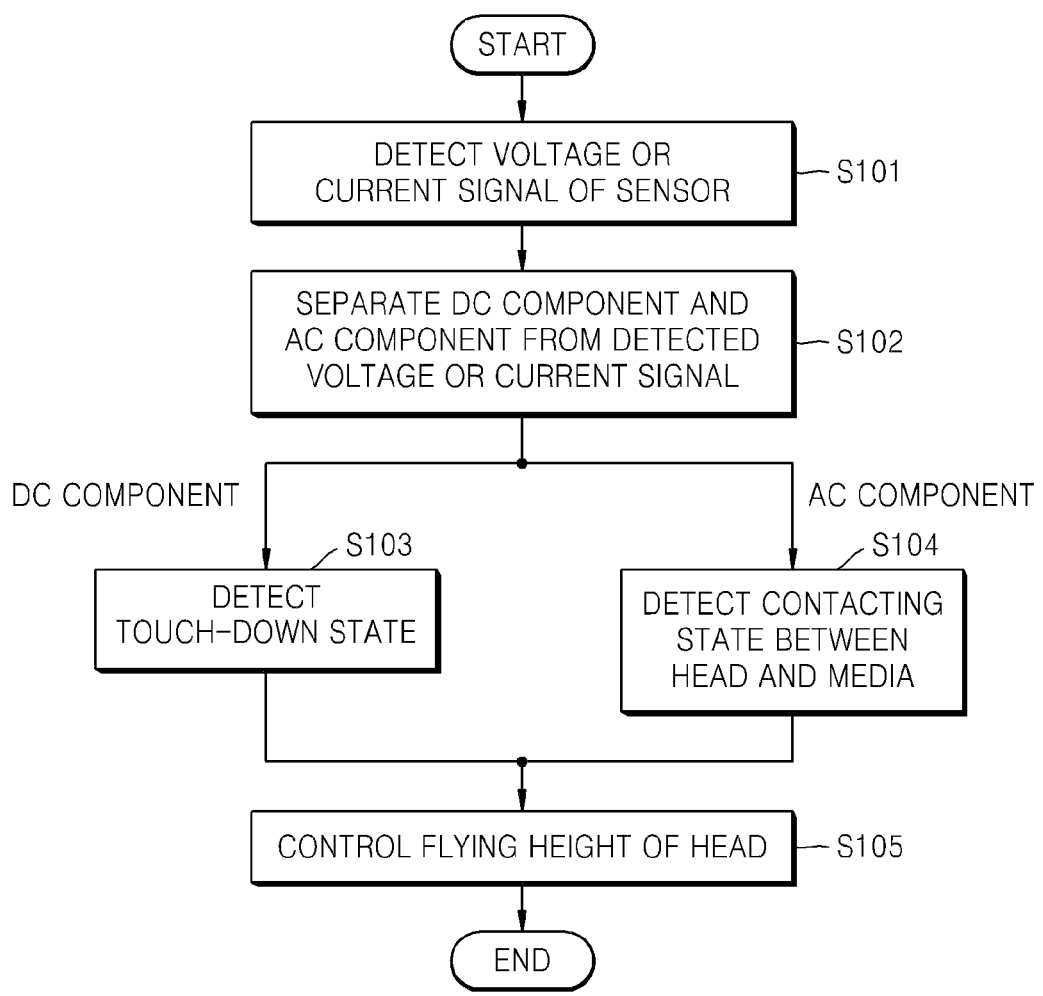
FIG. 12 is a flowchart illustrating an example embodiment of a method of adjusting a flying height of a head.

FIG. 12 is a flowchart illustrating an example embodiment of a method of adjusting the flying height of head 16.

A voltage signal across the sensor 6J or a current signal flowing through the sensor 6J is detected in operation S101 while a constant current or a constant voltage is applied to the sensor 6J mounted on slider 20. For example, the voltage or current signal may be detected by using the circuit of the sensor signal processor of FIG. 8 or 9.

Then in operation S102 a DC component of the detected voltage or current signal, and an AC component of the detected voltage or current signal, are separated from the detected voltage or current signal. The DC component and the AC component may be separated by using filters. In detail, the DC component may be separated by using a low pass filter and the AC component may be separated by using a high pass filter or a band pass filter.

In operation S103, the touch-down state of head 16 is detected in a touch-down test by using the DC component. In other words, while in the touch-down test mode head 16 is determined to be in the touch-down state when an amplitude or change rate of the DC component separated from the voltage or current signal satisfies a predetermined critical condition, wherein the amplitude or change rate is calculated while sequentially increasing the FOD DAC value applied to heater power supplying circuit 460. For example, referring to FIG. 21, a digital conversion value ADC Value of the DC component is monitored, and a point where the digital conversion value ADC Value starts to remarkably change is determined to be a touch-down point. Alternatively, referring to FIG. 22, a change rate of the digital conversion value ADC Value according to a change of the power FOD POWER is monitored, and a point where the change rate reaches zero is determined to be the touch-down point.

Next, in operation S104 the contacting state between head 16 and storage medium 150 in an operating state of the data storage device is detected by using the AC component separated from the voltage or current signal. In other words, an amplitude of the AC component is monitored under normal operation of the data storage device, and when the amplitude of the AC component is greater than or equal to a threshold value, it is determined that head 16 and storage medium 150 are contacting each other. Such detecting of the contacting state is also referred to as TA detection.

Then, in operation S105 the flying height of head 16 is controlled by using the result of detecting the touch-down state and/or the result of detecting the contacting state.

In other words, an FOD DAC value, FOD_target, corresponding to a target reference height may be determined from a profile of a changing amount of a magnetic space between disk 12 and head 16 according to a change of the FOD DAC value, based on the FOD DAC value (FOD DAC_TD) at a point in time when the touch-down state is detected by using the DC component in the touch-down test. Also, by using the determined value FOD_target to control the flying height of head 16, the flying height of head 16 may be controlled to be at the target flying height.

Also, when the contacting state between head 16 and storage medium 150 is detected by using the AC component while the data storage device is in an operating state, the flying height may be controlled so that TA does not occur by reducing the value FOD_target. For example, the flying height may be increased by decreasing the value FOD_target by one step. Alternatively, the value FOD_target may be reduced by one step if the number of times of head 16 and storage medium 150 contact each other is greater than a predetermined number within a predetermined time period.

Figure 13:
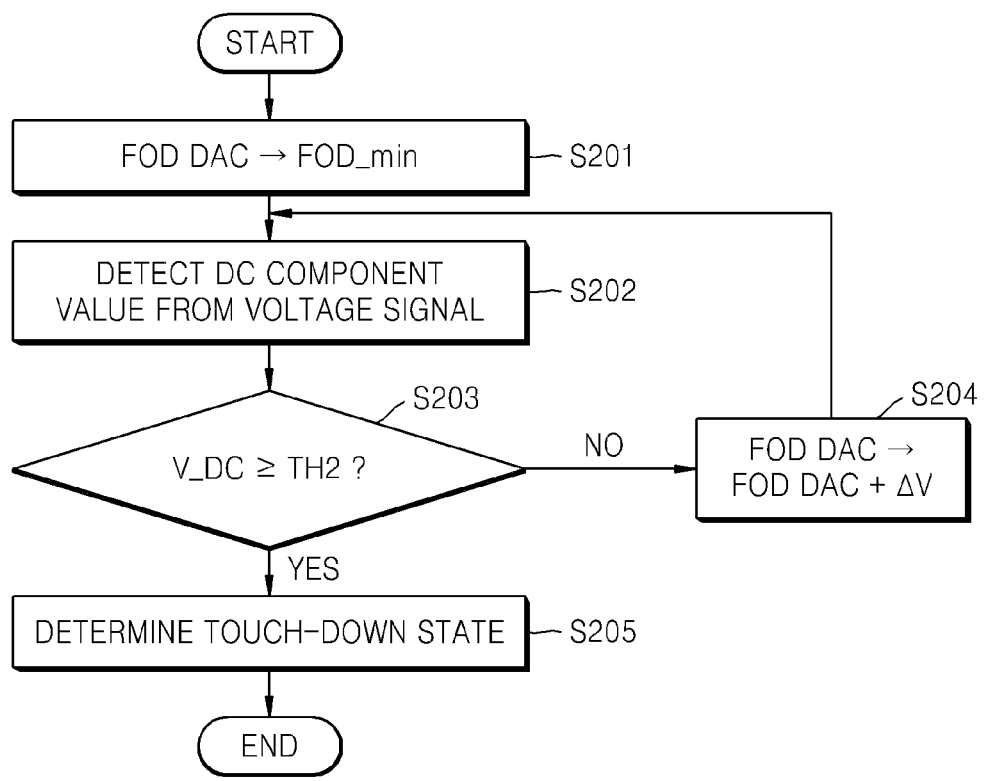
FIG. 13 is a flowchart illustrating an example embodiment of a method of detecting a touch-down of a head.

FIG. 13 is a flowchart illustrating an example embodiment of a method of detecting a touch-down of head 16.

In a touch-down test, controller 430 determines an initial FOD DAC value, i.e., a control signal for adjusting the flying height of head 16, to be a minimum value FOD_min, and applies the determined initial value to heater power supplying circuit 460 in operation S201. Here the minimum value FOD_min may be 0.

Then, in operation S202 a DC component value V_DC value is separated and detected from a voltage signal across the sensor 6J, while a constant current or a constant voltage is applied to the sensor 6J mounted on slider 20. Here, offset compensation and amplification may be performed on the DC component so that the DC component is adjusted to be within the input range of ADC 910.

Next, in operation S203 it is determined whether the DC component value V_DC value detected in operation S202 is greater than or equal to the second threshold value TH2. The method of determining the second threshold value TH2 has been described above, and thus details thereof are not repeated.

When it is determined in operation S203 that the DC component value V_DC value is less than the second threshold value TH2, the current value of the FOD DAC is increased by $\Delta V$ in operation S204, and then operation S202 is again performed. Here, $\Delta V$ denotes a unit increment of the control signal for adjusting the flying height of head 16.

When it is determined in operation S203 that the DC component V_DC value is greater than or equal to the second threshold value TH2, then it is determined in operation S205 that head 16 is in the touch-down state. In other words, head 16 is determined to have touched down if the DC component value V_DC value is greater than or equal to the second threshold value TH2, and thus the signal S_TD indicating that head 16 is in the touch-down state is generated, and at the same time, the value FOD DAC_TD of the applied FOD DAC is determined to be a touch-down reference value.

Figure 14:
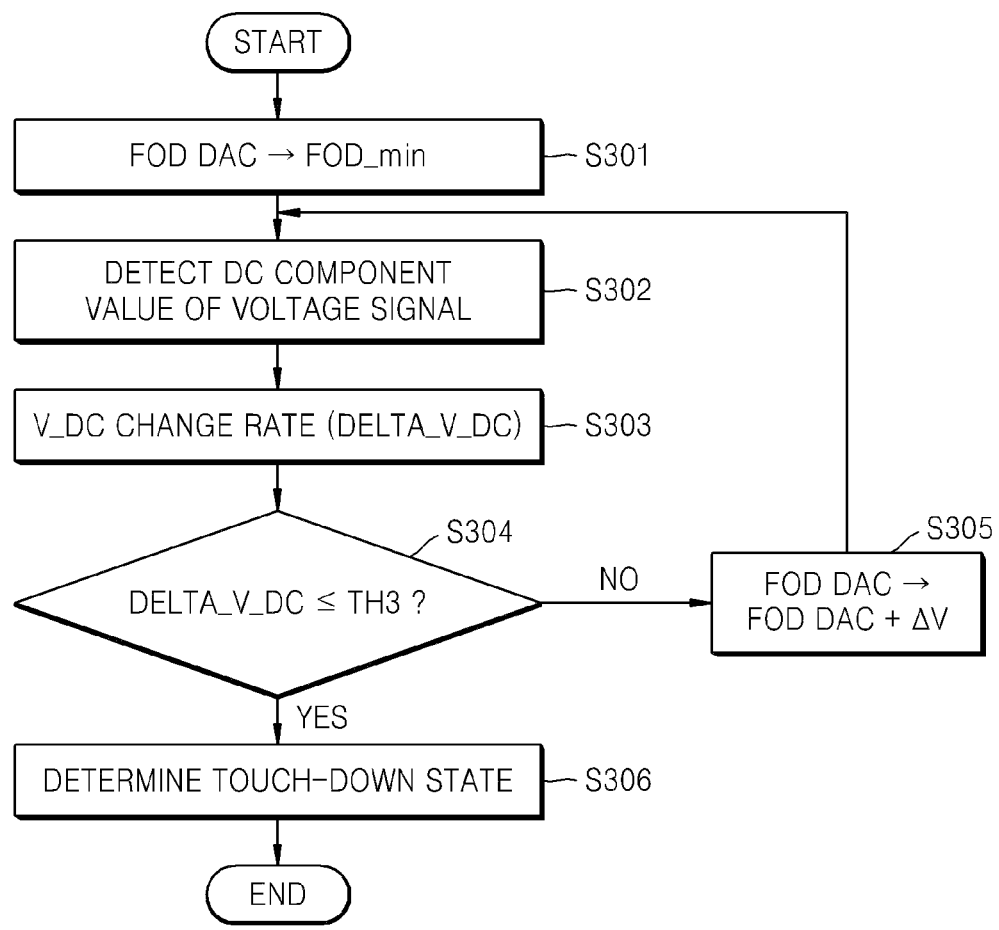
FIG. 14 is a flowchart illustrating one example embodiment of a method of detecting a touch-down of a head.

FIG. 14 is a flowchart illustrating another example embodiment of a method of detecting a touch-down of head 16.

In operation 301, controller 430 determines an initial FOD DAC value, i.e., a control signal for adjusting the flying height of head 16 in a touch-down test, to be a minimum value FOD_min, and applies the determined initial value to heater power supplying circuit 460. Here the minimum value FOD_min may be 0.

Then, a DC component value V_DC value is separated and detected from a voltage signal across the sensor 6J, while a constant current or a constant voltage is applied to the sensor 6J mounted on slider 20, in operation S302. Here, offset compensation and amplification may be performed on the DC component so that the DC component is adjusted to be included in the input range of ADC 910.

Next, a change rate DELTA_V_DC of the DC component value V_DC value is calculated in operation S303 with respect to power supplied to the heater 6I installed in slider 20. In other words, the change rate DELTA_V_DC may be obtained by dividing a changing amount of a DC component value V_DC value according to a changing amount $\Delta V$ of a value of a FOD DAC by a changing amount of power supplied to the heater 6I. Alternatively, the change rate DELTA_V_DC may be obtained by directly dividing the changing amount of the DC component value V_DC value by the changing amount $\Delta V$ of the FOD DAC value applied to heater power supplying circuit 460.

Then, in operation S304 it is determined whether the change rate DELTA_V_DC of the DC component value V_DC value is less than or equal to the third threshold value TH3. Here, the method of determining the third threshold value TH3 has been described above, and thus details thereof are not repeated.

If the change rate DELTA_V_DC is determined in operation S304 to be greater than the third threshold value TH3, then in operation S305 the current FOD DAC value is increased by $\Delta V$, and then operation S302 is again performed.

If the change rate DELTA_V_DC is determined to be less than or equal to the third threshold value TH3 in operation S304, it is determined that the head 16 is in the touch-down state in operation S306. In other words, head 16 is determined to have touched down if the change rate DELTA_V_DC is less than or equal to the third threshold value TH3, and thus the signal S_TD indicating that head 16 is in the touch-down state is generated, and at the same time, the applied FOD DAC value is determined to be a touch-down reference value FOD DAC_TD.

Figure 15:
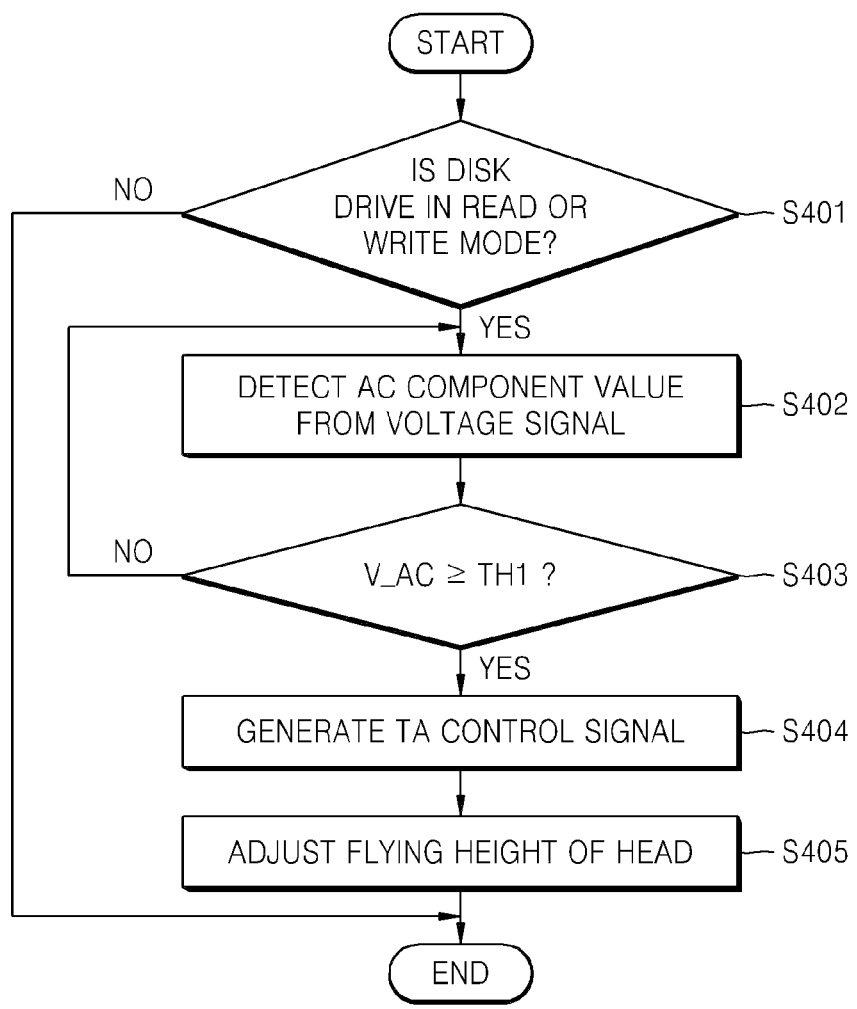
FIG. 15 is a flowchart illustrating one example embodiment of a method of detecting a contacting state between a head and a storage medium in an operating state of a data storage device.

FIG. 15 is a flowchart illustrating an example embodiment of a method of detecting a contacting state between head 16 and the storage medium 150 in an operating state of a data storage device such as a disk drive.

Controller 430 determines in operation S401 whether the disk drive is in a read mode or a write mode.

When the disk drive is in the read or write mode, in operation S402 an AC component value V_AC is separated from a voltage signal detected across the sensor 6J installed in slider 20 while applying a constant current or a constant voltage to the sensor 6J.

Then, in operation S403 it is determined whether the AC component value V_AC detected in operation S402 is greater than or equal to the first threshold value TH1. The method of determining the first threshold value TH1 has been described above, and thus details thereof are not repeated.

If it is determined in operation S403 that the AC component value V_AC is less than the first threshold value TH1, then operation S402 is performed again.

If it is determined in operation S403 that the AC component value V_AC is greater than or equal to the first threshold value TH1, then in operation S404 it is determined that head 16 and storage medium 150 are contacting each other, and thus a TA control signal is generated.

When the TA control signal is generated, controller 430 may decrease the current value TOD_target so as to control the flying height of head 16 in such a way that TA does not occur. For example, the value FOD_target may be decreased by one step so as to increase the flying height. Alternatively, the value FOD_target may be decreased by one step if the number of times that head 16 and storage medium 150 contact each other is greater than or equal to a threshold number of times within a predetermined time period. For reference, the TA control signal may be used to compensate for a phenomenon of a signal being distorted in a section where TA is detected.

As described above, a signal detected in the sensor 6J installed to slider 20 and having a resistance value that changes according to temperature is divided into a DC component and an AC component, a touch-down state is detected by using the DC component during a touch-down test, and a contacting state of head 16 and storage medium 150 in an operating state of the data storage device is detected by using the AC component.

The inventive concept may be executed as a method, a device, a system, or the like. When the method is executed as software, elements of the inventive concept are code segments executing operations that are necessarily required. Programs or code segments may be stored in a processor readable medium.

While the inventive concept has been particularly shown and described with reference to exemplary embodiments thereof, the exemplary embodiments should be considered in a descriptive sense only, and not for purposes of limitation. Thus, it will be understood by those of ordinary skill in the art that various changes in form and details may be therein without departing from the spirit and scope of the inventive concept as defined by the appended claims. Therefore, the scope of the inventive concept is defined not by the detailed description of the inventive concept but by the appended claims, and all differences within the scope will be construed as being included in the inventive concept.

What is claimed is:

1. A method of detecting a touch-down and contact between a head and a storage medium in a data storage device, the method comprising:
    separating a signal detected by a sensor into a direct current (DC) component and an alternating current (AC) component, wherein the sensor has an electrical characteristic which changes according to a temperature;
    using the DC component to detect a touch-down state of the head during a touchdown test to determine a value of a control signal for adjusting a flying height of the head, the value corresponding to a target flying height of the head; and
    using the AC component to detect a contacting state between the head and the storage medium in an operating state of the data storage device.

2. The method of claim 1, wherein the electric characteristic comprises a resistance.

3. The method of claim 1, wherein the sensor comprises a device comprising nickel iron (NiFe), and is installed in a slider in which the head is supplied.

4. The method of claim 1, wherein the signal detected by the sensor is separated into the DC component and the AC component by filters.

5. The method of claim 1, wherein the signal detected by the sensor comprises a voltage signal or a current signal detected by the sensor that corresponds to a resistance value of the sensor while a current or a voltage, respectively, generated by a constant current source or a constant voltage source is applied to the sensor.

6. The method of claim 1, wherein, in the detecting of the touch-down state of the head, an offset compensation is performed on the DC component so that the DC component is adjusted to be within an input range of an analog to digital converter, and the method further comprises generating information for determining the touch-down state when an amplitude or a change rate of the DC component having the compensated offset satisfies a threshold condition.

7. The method of claim 1, wherein, in the detecting of the contacting state between the head and the storage medium in the operating state, information for indicating that there is contact between the head and the storage medium is generated when an amplitude of the AC component is at least equal to a threshold value.

8. The method of claim 1, further comprising controlling the flying height of the head based on information generated by detecting the touch-down state of the head or the contacting state between the head and the storage medium.

9. The method of claim 1, wherein the control signal for adjusting the flying height of the head comprises a signal for adjusting power supplied to a heater installed in a slider in which the head is supplied.

10. An apparatus for detecting a touch-down and contact between a head and a storage medium in a storage device, the apparatus comprising:
    a sensor installed in a slider and having a resistance value that changes according to a temperature;
    a constant current source for supplying a constant current to the sensor;
    a direct current (DC) component extractor for separating and outputting a DC component from a voltage signal across two terminals of the sensor;
    an alternating current (AC) component extractor for separating and outputting an AC component from the voltage signal across the two terminals of the sensor;
    a subtractor for outputting an offset compensated DC component by subtracting an initially set offset voltage from the DC component output from the DC component extractor; and
    a determiner for determining a touch-down state of the head during a touchdown test to determine a value of a control signal for adjusting a flying height of the head corresponding to a target flying height of the head by using the offset compensated DC component, and for determining a contacting state between the head and the storage medium in an operating state of the data storage device by using the AC component output from the AC component extractor.

11. The apparatus of claim 10, further comprising at least one amplifier for amplifying the voltage signal across the two terminals of the sensor.

12. The apparatus of claim 10, wherein the DC component extractor comprises a low pass filter.

13. The apparatus of claim 10, wherein the AC component extractor comprises one of a high pass filter and a band pass filter.

14. The apparatus of claim 10, further comprising an over-voltage prevention circuit between the two terminals of the sensor.

15. The apparatus of claim 10, wherein the control signal for adjusting the flying height of the head comprises a signal for adjusting power supplied to a heater installed in a slider.

16. An apparatus for detecting a touch-down and contact between a head and a storage medium in a storage device, the apparatus comprising:
- a constant voltage source for generating a constant voltage, the constant voltage source having first and second terminals;
- a sensor installed in a slider and having a resistance value that changes according to a temperature, the sensor having first and second terminals where the second terminal is connected to the second terminal of the constant voltage source;
- a resistor having a fixed resistance value and being connected between the first terminal of the constant voltage source and the first terminal of the sensor;
- a direct current (DC) component extractor for separating and outputting a DC component from a voltage signal across the first and second terminals of the sensor;
- an alternating current (AC) component extractor for separating and outputting an AC component from the voltage signal across the first and second terminals of the sensor;
- a subtractor for outputting an offset compensated DC component by subtracting an initially set offset voltage from the DC component output from the DC component extractor; and
- a determiner for determining a touch-down state of the head in a touch-down test to determine a value of a control signal for adjusting a flying height of the head corresponding to a target flying height of the head by using the offset compensated DC component, and for determining a contacting state between the head and the storage medium in an operating state of the storage device by using the AC component output from the AC component extractor.

17. A disk drive, comprising:
a disk for storing information;
a slider in which are installed a heater, a sensor having a resistance value that changes according to a temperature, and a head for recording information on the disk or reading information from the disk;
a sensor signal processor for: separating a voltage signal across two terminals of the sensor or a current signal flowing in the sensor into a direct current (DC) component and an alternating current (AC) component that correspond to a resistance value of the sensor while a current or a voltage, respectively, generated by a constant current source or a constant voltage source is applied to the sensor; detecting a touch-down state of a head in a touch-down test to determine a value of a first signal corresponding to a target flying height of the head by using the separated DC component, and detecting a contacting state between the head and the disk in an operating state of the disk drive by using the separated AC component; and
a controller for generating the first signal for adjusting power supplied to the heater, and for adjusting the value of the first signal based on the result of determining the touch-down state of the head in the touch-down test, and the contacting state between the head and the disk in the operating state of the disk drive.

18. The disk drive of claim 17, wherein the sensor signal processor comprises:
- a constant current source for supplying a constant current to the sensor;
- a DC component extractor for separating and outputting the DC component from a voltage signal across the two terminals of the sensor;
- an AC component extractor for separating and outputting the AC component from the voltage signal across the two terminals of the sensor;
- a subtractor for outputting an offset compensated DC component by subtracting an initially set offset voltage from the DC component output from the DC component extractor; and
- a determiner for determining the touch-down state of the head in the touch-down test to determine the value of the first signal corresponding to the target flying height of the head by using the offset compensated DC component, and for determining the contacting state between the head and the disk in the operating state of the disk drive by using the AC component output from the AC component extractor.

19. The disk drive of claim 17, wherein the sensor signal processor comprises:
- a constant voltage source for generating a constant voltage;
- a resistor having a fixed resistance value;
- a sensor installed in a slider and having a resistance value that changes according to temperature change;
- a DC component extractor for separating and outputting a DC component from a voltage signal across two terminals of the sensor, in a circuit in which the constant voltage source, the resistor, and the sensor are connected in series;
- an AC component extractor for separating and outputting an AC component from the voltage signal across the two terminals of the sensor;
- a subtractor for outputting an offset compensated DC component by subtracting an initially set offset voltage from the DC component output from the DC component extractor; and
- a determiner for determining the touch-down state of the head during the touch-down state to determine the value of the first signal corresponding to the target flying height of the head by using the offset compensated DC component, and for determining the contacting state between the head and the disk in the operating state of the disk drive by using the AC component output from the AC component extractor.

* * * * *